US010469664B2

(12) United States Patent
Pirat et al.

(10) Patent No.: US 10,469,664 B2
(45) Date of Patent: Nov. 5, 2019

(54) SYSTEM AND METHOD FOR MANAGING MULTI-CHANNEL ENGAGEMENTS

(71) Applicant: GENESYS TELECOMMUNICATIONS LABORATORIES, INC., Daly City, CA (US)

(72) Inventors: Vincent Pirat, Brest (FR); Clement Choel, Guipronvel (FR); Christian Jacolot, Landerneau (FR); Vasudev Ramanujaiaha, Sunnyvale, CA (US); Christopher Connolly, New York, NY (US); Herbert Willi Artur Ristock, Walnut Creek, CA (US)

( * ) Notice: Subject to any disclaimer, the term of this patent is extended or adjusted under 35 U.S.C. 154(b) by 37 days.

(21) Appl. No.: 15/272,304

(22) Filed: Sep. 21, 2016

(65) Prior Publication Data

US 2018/0084111 A1    Mar. 22, 2018

(51) Int. Cl.
*H04M 3/00* (2006.01)
*H04M 5/00* (2006.01)
(Continued)

(52) U.S. Cl.
CPC ....... *H04M 3/5183* (2013.01); *H04M 3/5166* (2013.01)

(58) Field of Classification Search
CPC ....... H04L 67/02; H04L 67/10; H04L 51/046; H04L 67/22; H04L 51/14; H04L 51/16; H04L 67/104; H04L 65/1006; H04L 65/1083; H04L 65/1046; H04M 3/5191; H04M 3/5183; H04M 3/5175; H04M 3/5232; H04M 3/51; H04M 3/523;
(Continued)

(56) References Cited

U.S. PATENT DOCUMENTS 6,741,698 B1 * 5/2004 Jensen ................ H04M 3/5233
 379/265.02
7,409,451 B1 * 8/2008 Meenan .............. H04L 12/5692
 379/100.15
(Continued)

FOREIGN PATENT DOCUMENTS

WO    2016015008 A1    1/2016

OTHER PUBLICATIONS

"Future of the Customer Experience in the Digital World," Gartner IT Expo, christopher.connolly@genesys.com; Oct. 8, 2014, 54 pages.
(Continued)

*Primary Examiner* — Ahmad F. Matar
*Assistant Examiner* — Kharye Pope

(57) ABSTRACT

A contact center system for switching a communication event from one communication medium to another in a contact center, the system includes: a processor; and memory, wherein the memory has stored therein instructions that, when executed by the processor, cause the processor to: receive a first interaction request via a first media channel from an endpoint device; identify a second media channel different from the first media channel; transmit a signal for reserving a resource associated with the second media channel; and transmit a unique identifier associated with the reservation request to the endpoint device for establishing a second interaction request via the second media channel.

23 Claims, 20 Drawing Sheets

(51) Int. Cl.
*H04M 3/51* (2006.01)
*H04M 3/58* (2006.01)
*H04M 7/00* (2006.01)
*H04L 12/66* (2006.01)

(58) Field of Classification Search
CPC .............. H04M 3/5166; H04M 3/5233; H04M 3/5133; H04M 3/5141; H04M 3/493; H04M 3/42195; H04M 3/5235; H04M 2203/402
USPC ............ 379/265.09, 265.02, 265.12, 265.13; 370/352; 705/304
See application file for complete search history.

(56) References Cited

U.S. PATENT DOCUMENTS

| | | | |
|---|---|---|---|
| 7,657,502 | B2 | 2/2010 | Sasaki et al. |
| 8,000,989 | B1 | 8/2011 | Kiefhaber et al. |
| 8,117,538 | B2 | 2/2012 | Anisimov et al. |
| 8,681,970 | B2 | 3/2014 | Federov et al. |
| 8,767,927 | B2 | 7/2014 | Springer |
| 8,879,708 | B2 | 11/2014 | Zhakov |
| 8,934,612 | B2 | 1/2015 | Ristock et al. |
| 9,191,492 | B1* | 11/2015 | Miller .................. G06F 3/0482 |
| 9,398,152 | B2 | 7/2016 | Christensen |
| 9,426,291 | B1 | 8/2016 | Ouimette et al. |
| 2002/0131399 | A1* | 9/2002 | Philonenko ............ H04L 29/06 370/351 |
| 2004/0122941 | A1* | 6/2004 | Creamer ........... H04M 3/42059 709/224 |
| 2006/0126808 | A1* | 6/2006 | Dallessandro ...... H04M 3/5191 379/133 |
| 2007/0230681 | A1 | 10/2007 | Boyer et al. |
| 2008/0183569 | A1* | 7/2008 | Brandt .................. G06Q 30/02 705/14.61 |
| 2009/0003579 | A1* | 1/2009 | Singh ................ H04M 3/4938 379/211.01 |
| 2009/0154671 | A1* | 6/2009 | Weiss .................. H04L 65/1069 379/93.02 |
| 2009/0190743 | A1* | 7/2009 | Spottiswoode ..... H04M 3/5232 379/265.11 |
| 2009/0304172 | A1 | 12/2009 | Becerra et al. |
| 2011/0051918 | A1* | 3/2011 | Fan .................... H04M 3/5166 379/211.02 |
| 2011/0158398 | A1* | 6/2011 | Kannan ............... H04L 12/1827 379/265.09 |
| 2012/0051536 | A1 | 3/2012 | Chishti et al. |
| 2013/0071037 | A1 | 3/2013 | Isaacs |
| 2013/0090140 | A1 | 4/2013 | Morisaki et al. |
| 2013/0124641 | A1 | 5/2013 | Ryabchun et al. |
| 2013/0129074 | A1* | 5/2013 | Peterson ............. H04M 3/5141 379/265.09 |
| 2013/0343534 | A1* | 12/2013 | Nguyen .............. H04M 3/5191 379/265.09 |
| 2014/0019886 | A1 | 1/2014 | Kannan et al. |
| 2014/0079210 | A1 | 3/2014 | Kohler et al. |
| 2014/0115466 | A1* | 4/2014 | Barak .................. G06F 3/0484 715/716 |
| 2014/0164530 | A1 | 6/2014 | Stoertenbecker |
| 2014/0171034 | A1* | 6/2014 | Aleksin ................ G06Q 30/016 455/414.1 |
| 2014/0359709 | A1* | 12/2014 | Nassar ................ H04L 65/1083 726/4 |
| 2015/0003604 | A1 | 1/2015 | McCormack et al. |
| 2015/0215463 | A1 | 7/2015 | Shaffer et al. |
| 2015/0350443 | A1 | 12/2015 | Kumar et al. |
| 2016/0119477 | A1* | 4/2016 | Sharpe ............... G06Q 30/0261 379/265.09 |
| 2016/0212266 | A1 | 7/2016 | Soundar |
| 2017/0064083 | A1* | 3/2017 | Gilbert ................ H04M 3/5141 |
| 2017/0185921 | A1* | 6/2017 | Zhang ....................... G06F 8/60 |

OTHER PUBLICATIONS

"Pakistan startup set to change global IVRs," Mar. 23, 2015, http://www.fifthquadrant.com.au/announcements/pakistan-startup-set-to-change-global-ivrs, dated Feb. 10, 2016, 1 page.
"Context Service Overview," CISCO, Mar. 2015, 11 pages.
"Manage Customers' Journeys, Don't Take Them for a Ride," Mar. 12, 2015, http://thecxreport.genesys.com/2015/03/12/manage-customers-journeys-dont-take-ride/, 3 pages.
"How to find customer journey enlightenment and reach engagement nirvana," MyCustomer, Mar. 12, 2015, http://www.mycustomer.com/blogs-post/how-find-customer-journey-enlightenment-and-reach-engagement-nirvana/169394, 6 pages.
Nicastro, Dom, "Genesys Update Works to Engage Your Customers," Mar. 17, 2015, http://www.cmswire.com/cms/customer-experience/genesys-update-works-to-engage-your-customrs-028450.php?utm_source=MainRSSF-eed&utm_medium .., 2 pages.
"Genesys Releases Contextual Customer Experience Platform," Mar. 16, 2015, http://www.smartcustomerservice.com/Articles/News-Briefs/Genesys-Releases-Contextual-Experience-Platform-102708.aspx, 2 pages.
Minsker, Maria, "Genesys Debuts the Latest Version of its Customer Experience Platform," Mar. 16, 2015, http://www.destinationcrm.com/Articles/CRM-News/CRM-Featured-News/Genesys-Debuts-the-Latest-Version-of-Its-Customer-Experience-Platform-102714.., 1 page.
U.S. Appl. No. 14/887,297, filed Oct. 19, 2015, entitled "Optimized Routing of Interactions to Contact Center Agents Based on Machine Learning", 81 pages.
International Search Report and Written Opinion for Application No. PCT/US2017/052574, dated Jan. 5, 2018, 14 pages.
Partial Supplementary European Search Report for Application No. 17853833.6, dated Jul. 17, 2019, 13 pages.

* cited by examiner

SYSTEM AND METHOD FOR MANAGING MULTI-CHANNEL ENGAGEMENTS

CROSS REFERENCE TO RELATED APPLICATION

This application is related to U.S. application entitled "SYSTEM AND METHOD FOR RECOMMENDING COMMUNICATION MEDIUMS BASED ON PREDICATIVE ANALYTICS," filed on even date herewith, the entire content of which is included herein by reference.

BACKGROUND

1. Field

One or more aspects of example embodiments of the present invention relate to a system and method for managing a multimodal engagement.

One or more aspects of example embodiments of the present invention relate to a system and method for managing dynamic medium switching in an omnichannel engagement.

2. Description of the Related Art

In order to remain competitive in the modern commerce system, many businesses remain constantly vigilant of evolving consumer demands, and strive to provide customers with high quality products and services. To that end, many businesses employ contact centers that include various resources, such as automated systems and live human representatives, to process transactions and/or service the needs of their customers. Interactions with a customer defines a customer experience (CX) as a whole. These interactions with the customer may have the potential to enhance or dilapidate the customer relationship or the buying/servicing experience overall. Enhancing or optimizing such interactions may result in greater CX and positive outcome for the business.

The above information discussed in this Background section is only for enhancement of understanding of the background of the described technology, and therefore, it may contain information that does not constitute prior art.

SUMMARY

One or more aspects of example embodiments of the present invention are directed to systems and methods for managing multimodal communications.

One or more aspects of example embodiments of the present invention are directed to systems and methods for managing dynamic medium switching and/or selection in an omnichannel communication.

According to an example embodiment of the present invention, a contact center system for switching a communication event from one communication medium to another in a contact center is provided, the system including: a processor; and memory, wherein the memory has stored therein instructions that, when executed by the processor, cause the processor to: receive a first interaction request via a first media channel from an endpoint device; identify a second media channel different from the first media channel; transmit a signal for reserving a resource associated with the second media channel; and transmit a unique identifier associated with the reservation request to the endpoint device for establishing a second interaction request via the second media channel.

In an example embodiment, the unique identifier may be configured to expire after an expiration time has lapsed.

In an example embodiment, the reserved resource may be released when the second interaction request associated with the unique identifier is not received before lapse of the expiration time.

In an example embodiment, the instructions may further cause the processor to: receive the second interaction request associated with the unique identifier via the second media channel; and in response to identifying that the expiration time has not lapsed, route the second interaction request to the reserved resource.

In an example embodiment, a second user interface of the second media channel may be synchronized with a first user interface of the first media channel.

In an example embodiment, the second user interface may be updated based on events received by the first user interface.

In an example embodiment, the first and second user interfaces may be respectively first and second self-services menus, and menu options of the first and second self-service menus may differ based on capabilities of the first and second media channels.

In an example embodiment, the instructions may further cause the processor to: determine a wait time for interacting with a resource associated with the first media channel, and the instructions that cause the processor to identify the second media channel may be in response to identifying that the wait time for the resource at the first media channel exceeds a threshold wait time, and identifying that the second media channel has a wait time satisfying the threshold wait time.

In an example embodiment, the second media channel may be identified based on a reward predicted to be achieved by handling an interaction via the second media channel.

In an example embodiment, the second media channel may be further identified based on at least one of service rules associated with the interaction, customer preference, or capacity of contact center resources.

In an example embodiment, the first interaction request may be for a first mode of communication and the second interaction request may be for a second mode of communication different from the first mode.

According to an example embodiment of the present invention, a method for switching a communication event from one communication medium to another in a contact center is provided, the method including: receiving, by a processor, a first interaction request via a first media channel from an endpoint device; identifying, by the processor, a second media channel different from the first media channel; transmitting, by the processor, a signal for reserving a resource associated with the second media channel; and transmitting, by the processor, a unique identifier associated with the reservation request to the endpoint device for establishing a second interaction request via the second media channel.

In an example embodiment, the unique identifier may expire after an expiration time has lapsed.

In an example embodiment, the reserved resource may be released when the second interaction request associated with the unique identifier is not received before lapse of the expiration time.

In an example embodiment, the method may further include: receiving, by the processor, the second interaction request associated with the unique identifier via the second media channel; and in response to identifying that the expiration time has not lapsed, routing, by the processor, the second interaction request to the reserved resource.

In an example embodiment, a second user interface of the second media channel may be synchronized with a first user interface of the first media channel.

In an example embodiment, the second user interface may be updated based on events received by the first user interface.

In an example embodiment, the first and second user interfaces may be respectively first and second self-services menus, and menu options of the first and second self-service menus may differ based on capabilities of the first and second media channels.

In an example embodiment, the method may further include: determining, by the processor, a wait time for interacting with a resource associated with the first media channel, and the identifying of the second media channel may be in response to identifying that the wait time for the resource at the first media channel exceeds a threshold wait time, and identifying that the second media channel has a wait time satisfying the threshold wait time.

In an example embodiment, the second media channel may be identified based on a reward predicted to be achieved by handling an interaction via the second media channel.

In an example embodiment, the second media channel may be further identified based on at least one of service rules associated with the interaction, customer preference, or capacity of contact center resources.

In an example embodiment, the first interaction request may be for a first mode of communication and the second interaction request may be for a second mode of communication different from the first mode.

According to an example embodiment of the present invention, a contact center system for switching a communication event from one communication medium to another in a contact center is provided, the system including: means for receiving a first interaction request via a first media channel from an endpoint device; means for identifying a second media channel different from the first media channel; means for transmitting a signal for reserving a resource associated with the second media channel; and means for transmitting a unique identifier associated with the reservation request to the endpoint device for establishing a second interaction request via the second media channel.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Figure 1A:
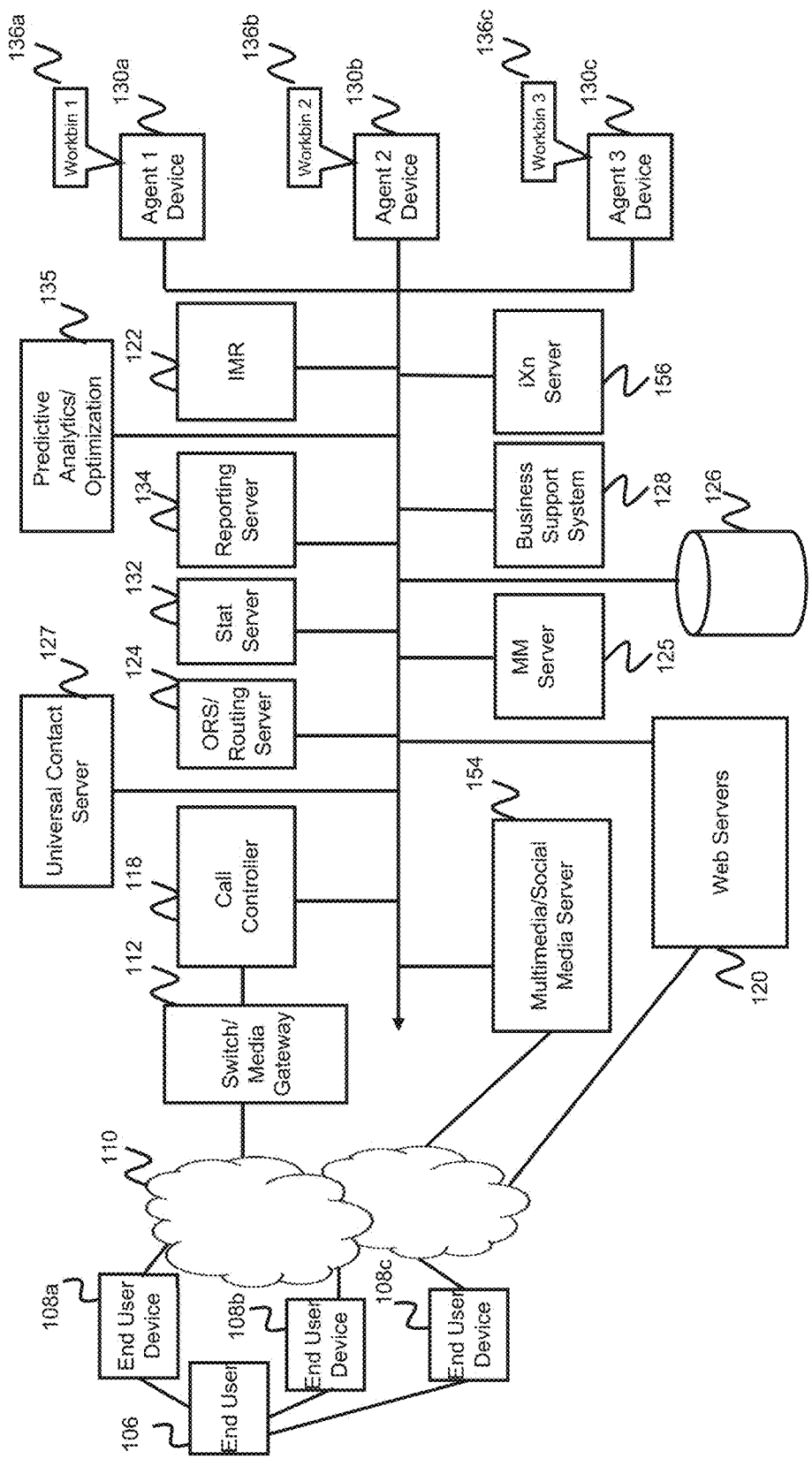
FIG. 1A is a schematic block diagram of a system for supporting a contact center in providing contact center services according to one exemplary embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Unless otherwise noted, like reference numerals denote like elements throughout the attached drawings and the written description, and thus, descriptions thereof will not be repeated.

Contact centers may utilize a number of communication channels (e.g., mediums or modalities) to engage with its customers, such as telephone, email, web chat, etc. The number of such communication channels is exploding across multiple devices and platforms. For example, while telephonic communications are still dominant for customer engagement, consumers are increasingly engaging via online (web), digital (chat, email, video, SMS, Apple Messages, Viber, Skype, WhatsApp, etc.), and social media channels (e.g., Facebook, Snapchat, Instagram, Twitter, etc.), along with other emerging channels like screen sharing and virtual assistants. These communication channels are in addition to traditional engagement channels, such as storefronts, kiosks, and advertising.

Further, many customers today regularly use two or more communication channels to accomplish their goals, which can be problematic for many companies as they struggle to manage multiple related interactions as a single conversation across different channels and over time. For example, interactions between contact center resources (e.g., live agents and self-service systems) and outside entities (e.g., customers) may be conducted over communication channels such as voice/telephony (e.g., telephone calls, voice over IP or VoIP calls, etc.), video (e.g., video chat, video conferencing, etc.), text (e.g., emails, text chat, etc.), and/or other suitable mediums (e.g., social media, etc.). In many cases, the customer may have access to one or more devices capable of interacting with contact center resources over the different mediums concurrently (e.g., simultaneously or at the same time), and/or may desire to switch to or resume communications from one medium (e.g., voice) on another (e.g., chat).

Generally, customers may desire to interact over their preferred channels (e.g., web, mobile, phone, chat, social media, retail stores, etc.), while receiving consistent experiences, treatments, and offers across the preferred channels. Further, customers desire to be able to start an interaction on one channel and then resume the interaction on another channel, without having to repeat themselves.

For example, in some cases, a customer may desire to have a multi-channel communication concurrently through multiple mediums in order to, for example, fill a form visually, while being provided voice instructions through an interactive voice response (IVR) system or through a live agent. In some cases, a customer interacting with the IVR system may wish to switch to a visual interface (e.g., a web site or email), for example, to submit a form via text. In some cases, a customer desiring to speak with a live agent over a voice medium may decide to switch the interaction modality to chat, for example, when the wait time for engaging in a chat session is shorter than a voice session. There may be many combinations of interactions and use cases to engage customers in multi-channel communications.

According to one embodiment, a multi-channel communication may refer to a multimodal communication or an omnichannel communication/conversation. According to one embodiment, a multimodal communication is a communication where two or more communication modalities (also referred to as modes of communication, communication channels, media channels, media types, or communication mediums) are invoked concurrently during a single communication session, engagement, or conversation. An omnichannel communication/conversation includes, in one embodiment, one or more communication sessions, engagements, or conversations, occurring over multiple communication mediums or media types, over time, without losing context of the interactions. In some embodiments, multichannel communication may refer to communications over multiple channels of a same media-type (e.g. two chat sessions).

FIG. 1A is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, software programs, data management, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center may initiate inbound communications (e.g., telephony calls) to the contact center via one or more end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the communication server 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the communication server 122 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1A the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

In some embodiments, the contact center system may include a multimodal server (MM server) 125 configured to work with the orchestration/routing server 124 for coordinating a multimodal interaction occurring in two or more communication channels. For example, the multimodal server 125 may deliver real-time updates and actions to enable a customer to perform an action on any of the channels at any time. For example, the multimodal server 125 may adapt incoming data from the orchestration server 124 into a format that may be rendered on one or more of the end user devices 108a-108c.

In some embodiments, the contact center system may include a predictive analytics/optimization server 135 that may be invoked by the multimodal server 125 or the orchestration server 124 to suggest a different communication modality for a particular interaction. For example, in some embodiments, the selection of a modality may be based on business requirements. In some embodiments, the selection of a modality may be based on various considerations, for example, such as customer segmentation preferences, logical preferences exhibited by the customer in social interactions, historical best hit rate, customer conversion rate, customer mood or personality, statistics collected over time, customer profile, customer capabilities, best or optimal business outcome, call center capabilities, call center load, and/or any other data (e.g., unstructured rich data) collected by the contact center system.

The various servers of FIG. 1A may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 1B:
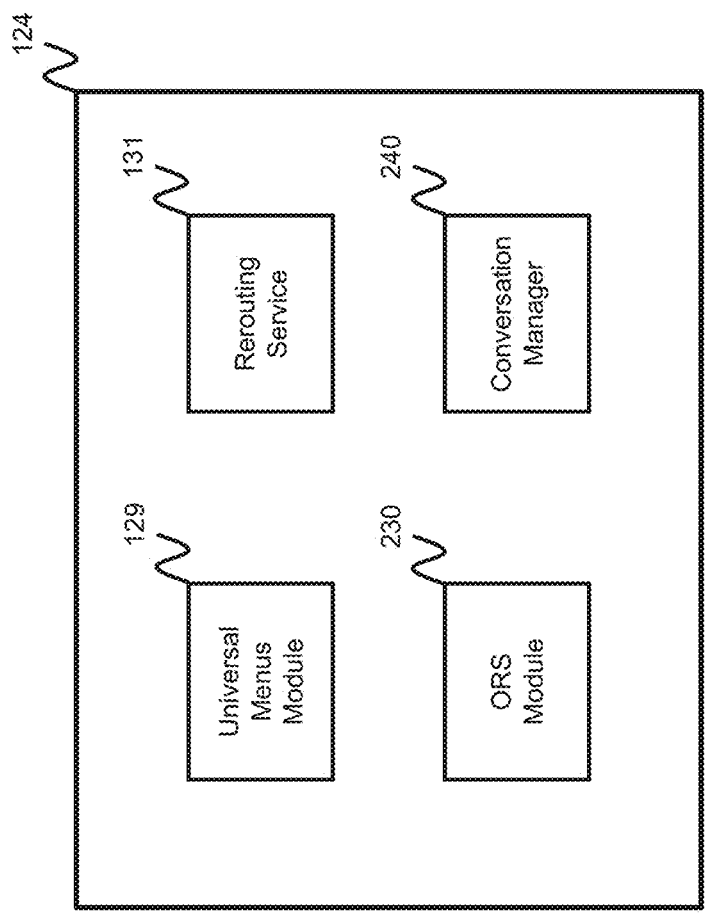
FIG. 1B is a more detailed block diagram of the orchestration/routing server shown in FIG. 1A according to one exemplary embodiment of the present invention.

FIG. 1B is a more detailed block diagram of the orchestration/routing server 124 according to one embodiment of the invention. The orchestration server 124 may include an orchestration module 230, conversation manager 240, rerouting service 131, and universal menus module 129, which may be implemented, in one example, as software objects or modules. Although these modules are assumed to be separate functional units, a person of skill in the art will recognize that the functionality of the modules may be combined or integrated into a single module, or further subdivided into further sub-modules without departing from the spirit of the invention.

The orchestration module 230 may be configured to execute a routing strategy for processing interactions, whether multimodal, omnichannel, or simple (single) interactions. The orchestration module 230 may further be coupled to the multimodal server 125 for receiving context (e.g. user inputs) on one or more modalities, and may forward the context information to the conversation manager 240. The orchestration module 230 may be configured to provide instructions to the multimodal server 125 on outputs to be rendered in the various modalities based on the monitored interaction(s) and the routing strategy that is executed. The conversation manager 240 may be a state machine that maintains the state of the one or more interactions, and changes the state based on the context information provided by the multimodal server 125.

In some embodiments, the rerouting service 131 may be invoked by a current routing strategy for determining whether an interaction invoked via a current media channel should be rerouted to a second (different) media channel. The second media channel may be one determined to have a waiting time that satisfies a threshold waiting time. According to one embodiment, the rerouting service 131 (or orchestration module 230) may be configured to reserve a resource (e.g., a live agent) at the second media channel upon determining that the rerouting is needed or desired.

In some embodiments, the universal menus module 129 may be invoked for dynamically generating an appropriate self-service menu based on the detected modality of a current interaction. According to one embodiment, the various self-service menus are generated from the single server without the need to invoke separate self-service menu servers that would depend on the modality that is invoked.

Multimodal System

Figure 2:
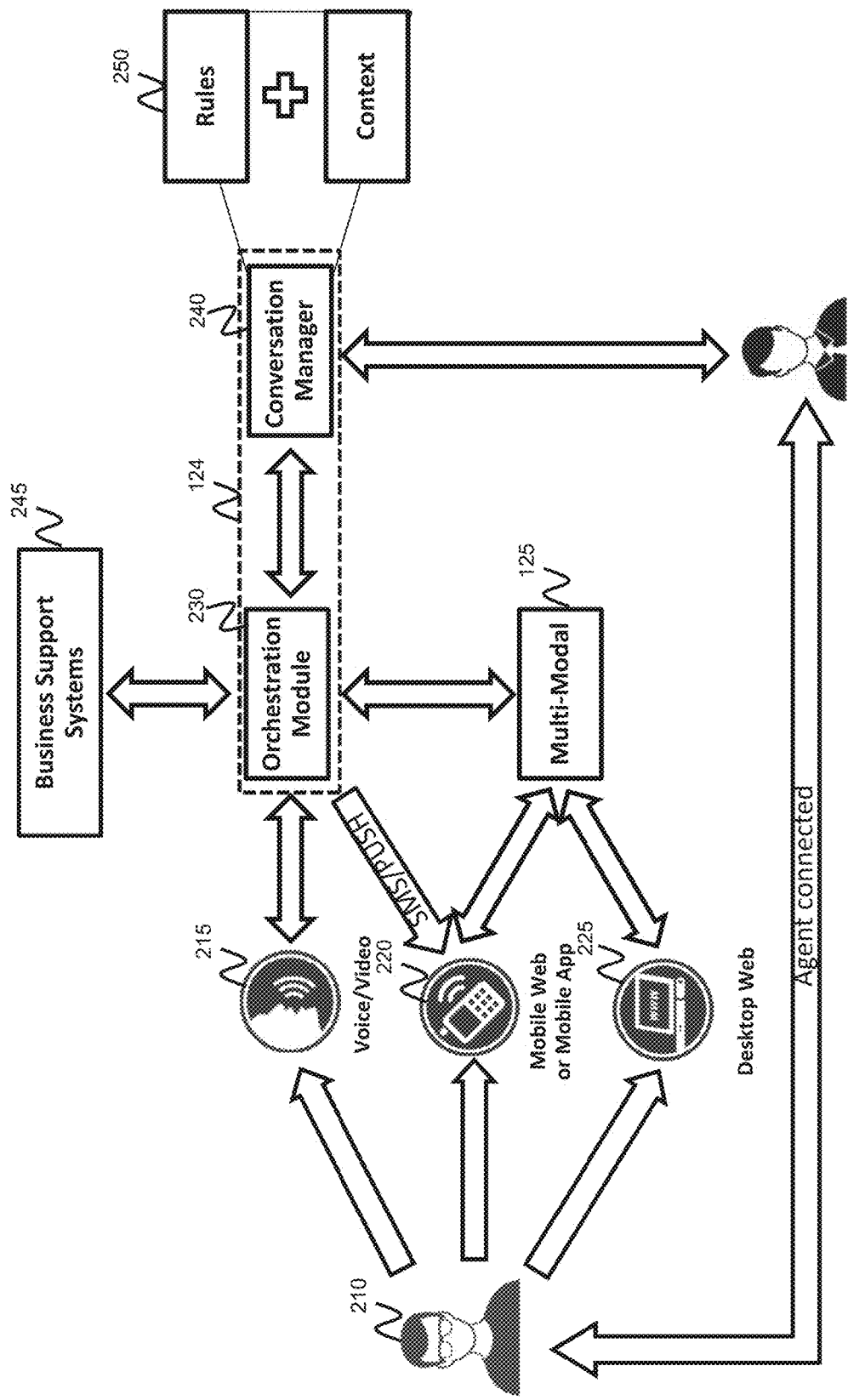
FIG. 2 is a schematic diagram of certain components of the contact center system of FIGS. 1A and 1B, for providing multimodal/omnichannel interaction capabilities according to an exemplary embodiment of the present invention.

FIG. 2 is a schematic diagram of certain components of the contact center system of FIGS. 1A and 1B, for providing multimodal/omnichannel interaction capabilities according to an example embodiment of the present invention.

Referring to FIG. 2, a user (or customer) 210 may have one or more devices, which may be similar to the end user devices 108 of FIG. 1A, capable of communicating with the contact center through one or more media channels. For example, the user 210 may have access to a media connection device (e.g., a mobile phone or a LAN line phone) 215 capable of voice or video communications (e.g., PSTN, WebRTC, Siri, Facetime, etc.). The user 210 may also have access to a visual interface device (e.g., a native application, such as mobile web browser or mobile application) 220 and/or a web browser device (e.g., a desktop browser) 225 to render visual content. The media connection device 215, visual interface device 220, and web browser device 225 may be the same device, or may be different devices from each other.

The orchestration module 230 may contain logic for handling multimodal/omnichannel interactions utilizing two or more communication channels. For example, the orchestration module 230 may coordinate with the multimodal server 125 to deliver real-time updates and actions on each of the channels in response to customer activities on any of the channels. In this regard, the orchestration module 230, along with the multimodal server 125 and the conversation manager 240, may generate a user interface during run-time for each of the channels that may be based on the interaction occurring in the various channels. For example, if a voice channel and a visual channel are concurrently invoked during an interaction, the orchestration module 230 provides visual content and corresponding voice content to the multimodal server 125.

According to one embodiment, the multimodal server 125 provides a real-time interface to the orchestration module 230 by proxy. In this regard, the multimodal server 125 communicates with the user devices in different modalities to allow the devices to interact and be synchronized in real-time. The multimodal server 125 is also configured to send events to the various modalities, and relay context (e.g., user inputs) to the orchestration module 230. The orchestration module 230 is configured to identify appropriate content to be provided next in response to the context, and is further configured to provide such content to the multimodal server 125 along with instructions for outputting the content The multimodal server 125 receives the instructions from the orchestration module 230, and dynamically generates audio and/or visual content for presenting the content on the user interface of one or more devices 215, 220, 225 that are accessible to the user 210. For example, the multimodal server 125 may dynamically generate visual user interfaces (e.g., IVR menu, video, etc.) that are rendered by the one or more end user devices (e.g., visual interface device 220, web browser device 225, etc.). The content is synchronized for a multimodal interaction. For example, if the user is navigating both a voice IVR and a visual IVR (e.g., both through the IMR 122 shown in FIG. 1), a user selection (event) received in the voice IVR serves to update not only the voice IVR, but also the user interface of the web IVR, and the same vice-versa.

In more detail, the orchestration module 230 receives context (e.g., user interaction or user generated events) provided by the IVR or other multimodal channels (e.g., mobile web/mobile application 220, desktop web 225, set-top box, etc.) through the multimodal server 125. The orchestration module 230 coordinates interaction between the multimodal server 125, the conversation manager 240, and other systems or components (e.g., business support systems 245, third party systems, and/or other optional components/services). In some embodiments, the other components/services may include, for example, a URL link shortening service, text to speech (TTS) service, automatic speech recognition (ASR) service, passbook service, PUSH notification service, short-messaging service, and the like.

The multimodal server 125 is configured to relay events between the user's one or more devices and the orchestration module 230. In this regard, the multimodal server 125 may transform incoming data from the orchestration module 230 into a format that may be rendered/output on the user's one or more devices.

According to one embodiment, the conversation manager 240 provides context for the interaction, reasons for the call, and/or best options to provide the user on self-service systems, thereby customizing the user experience for the particular user. The conversation manager 240 receives events (e.g., actions and/or inputs) from the user through the orchestration module 230, and instructs the orchestration module 230 to generate different, but connected user experiences based on context of the events, to be rendered on the user's one or more devices. In some embodiments, the conversation manager 240 may consult rules 250 to determine next actions according to the context of the received events. In some embodiments, the conversation manager 240 may utilize machine learning to determine the next actions or media type that the user may prefer to engage with according to the context of the received events and historical customer data, profile, and other relevant data elements. For example, the conversation manager 240 may select a best suited channel for conducting a cross-sell/up-sell for a particular user. According to one embodiment, the conversation manager 240 may also determine that a particular user is to be placed on a particular channel which is used as a waiting room, until a required agent becomes available. When the agent become available, communication is established with the agent over a different channel.

For example, referring to FIG. 2, the user 210 may initiate a first interaction by placing a phone/video call to the call center via the media connection device 215. The interaction is routed by the orchestration module 230 to the IMR server 122 for being greeted with a self-service option. According to one embodiment, the first interaction is associated with a session ID which may be generated, for example, by the call controller 118 and passed along to the orchestration module 230. The user may receive customized call treatment on the IMR server 122 based on the logic driven by the orchestration module 230 and the conversation manager 240.

The orchestration module 230 may then execute business logic that determines that the user 210 should be invited to a multimodal session via a different channel. For example, the orchestration module 230 may identify that the user is engaging via a smart phone or a mobile phone, and thus, a link including a unique URL or corresponding to the user's phone number may be sent to the user's device via an SMS or PUSH notification, to invite the user to a multimodal session. In some embodiments, the user may utilize the link to open a visual communication channel on either the smart phone/mobile phone 220 or through another device, such as, for example, the desktop web 225.

The user 210 initiates a second interaction through the link by clicking on the link or entering the link through mobile web/mobile app 220 or through desktop web 225. An event is relayed from the user device to the multimodal server 125, which is then forwarded to the orchestration module 230. The orchestration module 230 identifies that the user 210 is engaged with the IMR through the first interaction, and instructs the multimodal server 125 to start a multimodal session. The multimodal session is associated with the session ID of the first interaction. Thus, in this example, the user 210 is now engaged through two modalities, a voice media channel that uses the media connection device 215, and a visual media channel that uses the mobile app/mobile web 220 or desktop web 225. The interaction in both modalities is tracked and synchronized, and context is maintained as the customer concurrently utilizes both modalities at the same time, or moves from one modality to another. For example, if the user navigating through an IVR during a telephony call decided to switch or concurrently invoke a visual IVR provided by the desktop device, the responses to prompts provided so far would be captured and used by the orchestration server to synchronize the visual IVR with the telephony IVR. In this manner, the visual IVR does not repeat the questions that were already asked and answered while interacting with the telephony IVR.

While it has been described with reference to FIG. 2 that the customer has called the call center to initiate the first interaction request, the present invention is not limited thereto. For example, in some embodiments, the first interaction request may be a text message (e.g., SMS), an email, a video chat, an interaction at a website associated with the contact center, an interaction with a set-top box, an interaction via a social media site, an interaction with a mobile application on the customer's mobile device, or any other communication method that is known in the art.

Figure 3:
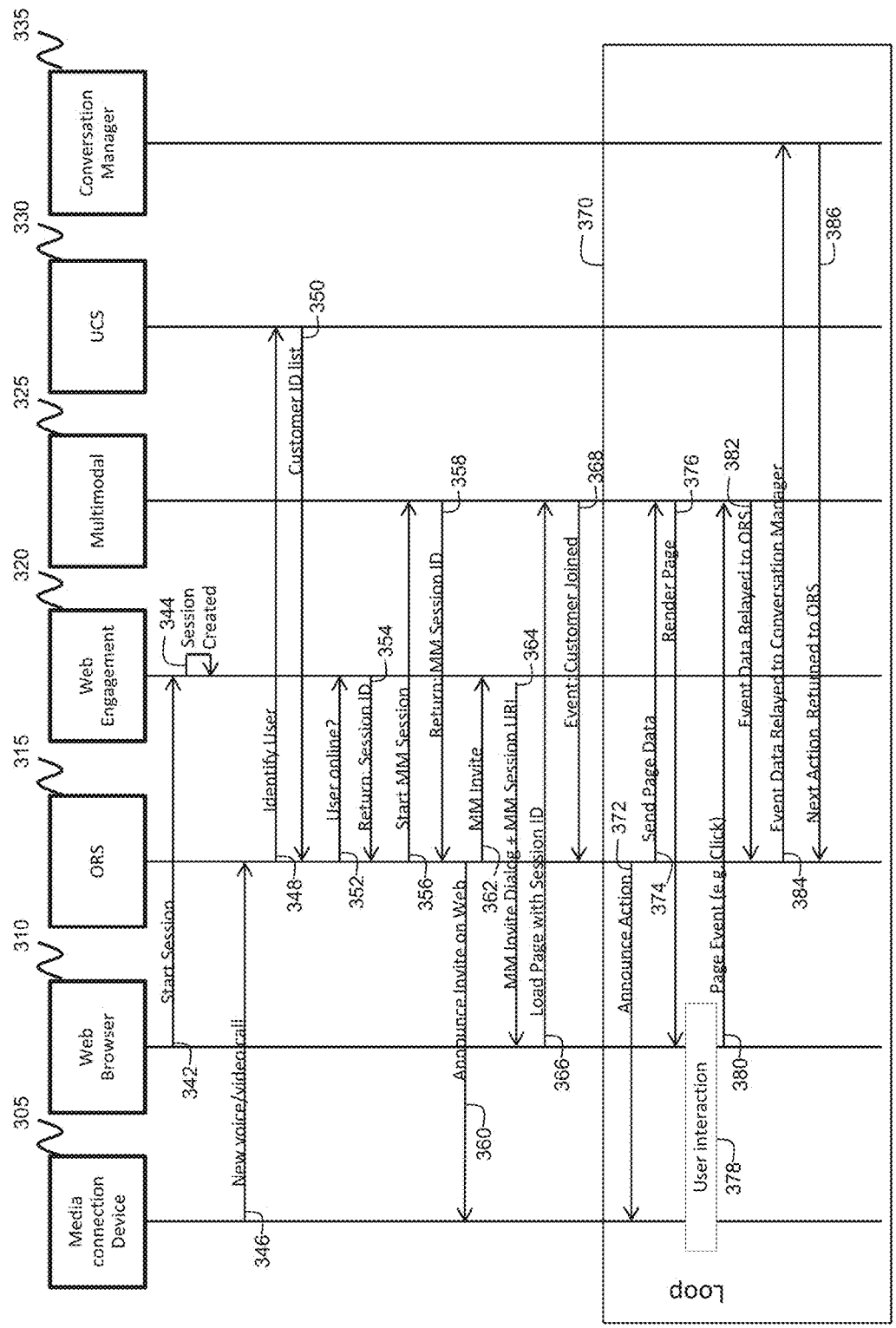
FIG. 3 is a signal flow diagram of a multimodal interaction according to an exemplary embodiment of the present invention.

FIG. 3 is a signal flow diagram of a multimodal interaction according to an example embodiment of the present invention. Referring to FIG. 3, a user invokes logic in a web browser 310 running on an endpoint device (e.g., a desktop computer) to start a web session at act 342 to initiate a first interaction with a corresponding contact center. A web engagement module 320, which may be hosted, for example, in the multimedia/social media server 154, creates a session at act 344 identified by a session ID. In response to the contact by the web browser, the web engagement service 320 may store a cookie with available information about the user (e.g., an email address) in the user's web browser 310.

The user subsequently initiates a voice/video call (e.g., a telephone call) at act 346 with the contact center via a media capable endpoint device (e.g., a mobile phone or a LAN line phone) to initiate a second interaction with the contact center. For example, the user initiates a voice call to a phone number associated with the contact center.

In response to the voice call, the orchestration module 315 (which may be similar to the orchestration module 230) performs a lookup via a universal contact server (UCS) 330 (which may be similar to UCS 127) at act 348, to determine whether or not any users associated with a telephone number, for example, of the media connection device 305 is known. The UCS 330 returns a list (e.g., a Customer ID list) including zero or more customers 350 that match the telephone number at act 350. The list may also include additional information known about the user. For example, the list may include the customer's name, address, email address, etc.

The orchestration module 315 interacts with web engagement module 320 to identify whether or not any of the customers from the list is online at act 352. Web engagement module 320 identifies that the user is online (e.g., via the user's email address) and returns the session ID at act 354.

Orchestration module 315 starts a multimodal session at act 356 with a multimodal server 325 (which may be similar to the multimodal server 125), and the multimodal server 325 provides a multimodal session ID to the orchestration module 315 at act 358.

The orchestration module 315 announces, via media connection 305 (e.g., telephone), that the user is invited to join the multimodal session via web at act 360. For example, the orchestration module 315 may announce to the user via IVR, for example, to check his or her web browser for an invite to join the multimodal session.

The orchestration module 315 also instructs the web engagement server 320 (e.g. concurrently with the invitation over the IVR), to send a multimodal invite to the web browser 310 at act 362. In response, the web engagement server 320 sends the multimodal invite at act 364 with a multimodal session URL to the user via the web browser 310. For example, the web engagement server 320 may send the multimodal session URL via a PUSH notification to the web browser 310.

In response to the user clicking on the URL via the web browser 310 at act 366, the web browser 310 loads a page associated with the multimodal session ID from the multimodal server 325. The multimodal server 325 informs the orchestration module 315 that the user has joined the multimodal session at act 368. Thus, the user is now concurrently engaged with the contact center via the web browser 310 and via the media connection device 305 (e.g., the telephone)

As a result of the user engaging in the multimodal session, a loop 370 begins, during which the user generates response events in response to instructions or queries announced through the media connection device 305 and/or through the web browser 310 on the user's one or more endpoint devices. For example, the orchestration module 315 announces instructions or actions at act 372 via voice or video (e.g., the IVR) through the media connection device 305, and concurrently sends page data at act 374 to the multimodal server 325 for rendering a page (e.g., a visual page) at act 376 on the web browser 310.

The user interacts (e.g., generates response events) with the IVR and/or the page at act 378, respectively, via the media connection device 305 and the web browser 310. For example, the user may interact with the web browser 310 by clicking a link to generate a page event. Page event data is relayed at act 380 from the web browser 310 to the multimodal server 325, and the multimodal server 325 relays the page event data at act 382 to the orchestration module 230. The orchestration module 230 relays the page event data at act 384 to the conversation manager 335, and the conversation manager returns a next action at act 386 to the orchestration server 315 according to context of the page event data and according to rules and/or machine learning.

The process then loops at 370 so that the next action is announced at act 372 through the media connection device 305 and a next page is rendered at act 376 through the web browser 310, until at least one or more of the interactions are terminated.

Accordingly, the user is able to engage with the contact center through two or more media channels concurrently, and when the user submits response events through one of the two or more media channels, the multimodal system keeps the user experience on each of the two or more media channels in sync.

According to one embodiment, the various interfaces, menus, and the like (collectively referred to as "pages") that are output in the different modalities are kept consistent in terms of content and navigation structure, via the use of page templates. The page templates may define the look and feel of a menu presented to the user, and content of the menus may be dynamically generated according to the context of the interaction and detected events (e.g. user inputs).

In some embodiments, there may be a collection of page templates for corresponding page types. For example, there may be one or more page templates for each of an authentication page, menu layout page, form filling page, content rendering page, media rendering page, and the like.

According to some embodiments the various pages may be generated using JavaScript Object Notation (JSON). For example, a startup page may be generated via the below exemplary code:

```
{
    event: 'page',
    pageData:{
        pageName: 'Support',
        headerImg: 'images/logo.png',
        centerImg: 'images/image.jpg',
        introText: 'Get the best out of your device with live support',
        pageButtons:[
            {name:'Back',action: 'back'},
            {name:'Continue',action: 'expert'}
        ]
    }
}
```

Figure 14A:
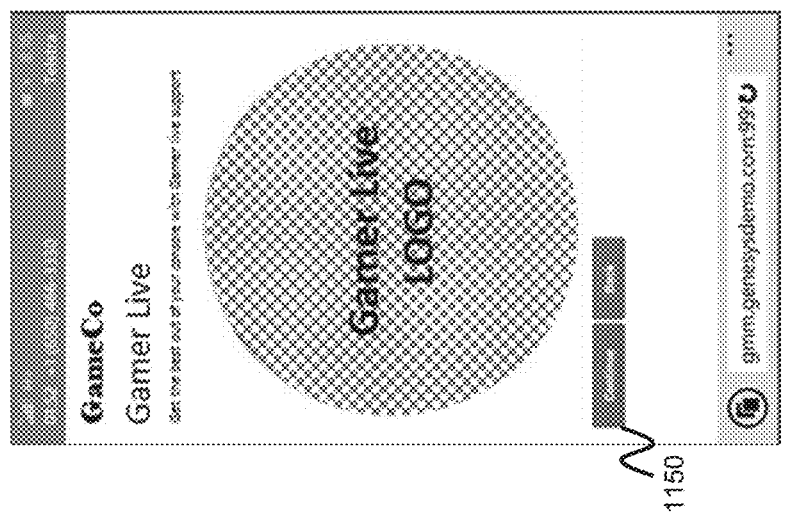
FIG. 14A is a screen shot of a startup page that is rendered on the end user device according to an exemplary embodiment of the present invention.

FIG. 14A is a screen shot of a startup page that is rendered on the end user device based on the above code. Selection of a continue option 1150 invokes a menu page to be rendered next. The menu page may be generated via the below exemplary JSON code:

```
{
    event: 'menu',
    pageData: {
        pageName: 'Box',
        headerImg: 'images/logo.png',
        introText: 'Please tell us the reason for your call today',
        menuItems: [
            {name: 'Service',action: 'service'},
            {name: 'Support',action: 'info'},
            {name: 'Password Reset',action: 'expert'}]
        },
        pageButtons: [
            {name: 'Back',action: 'back'}
        ]
    };
```

Figure 14B:
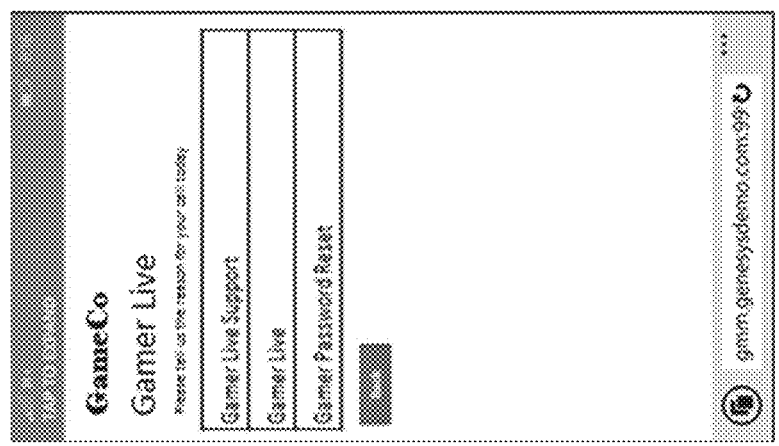
FIG. 14B is a screen shot of a menu page that is rendered on the end user device according to an exemplary embodiment of the present invention.

FIG. 14B is a screen shot of a menu page that is rendered on the end user device based on the above code.

Figure 4:
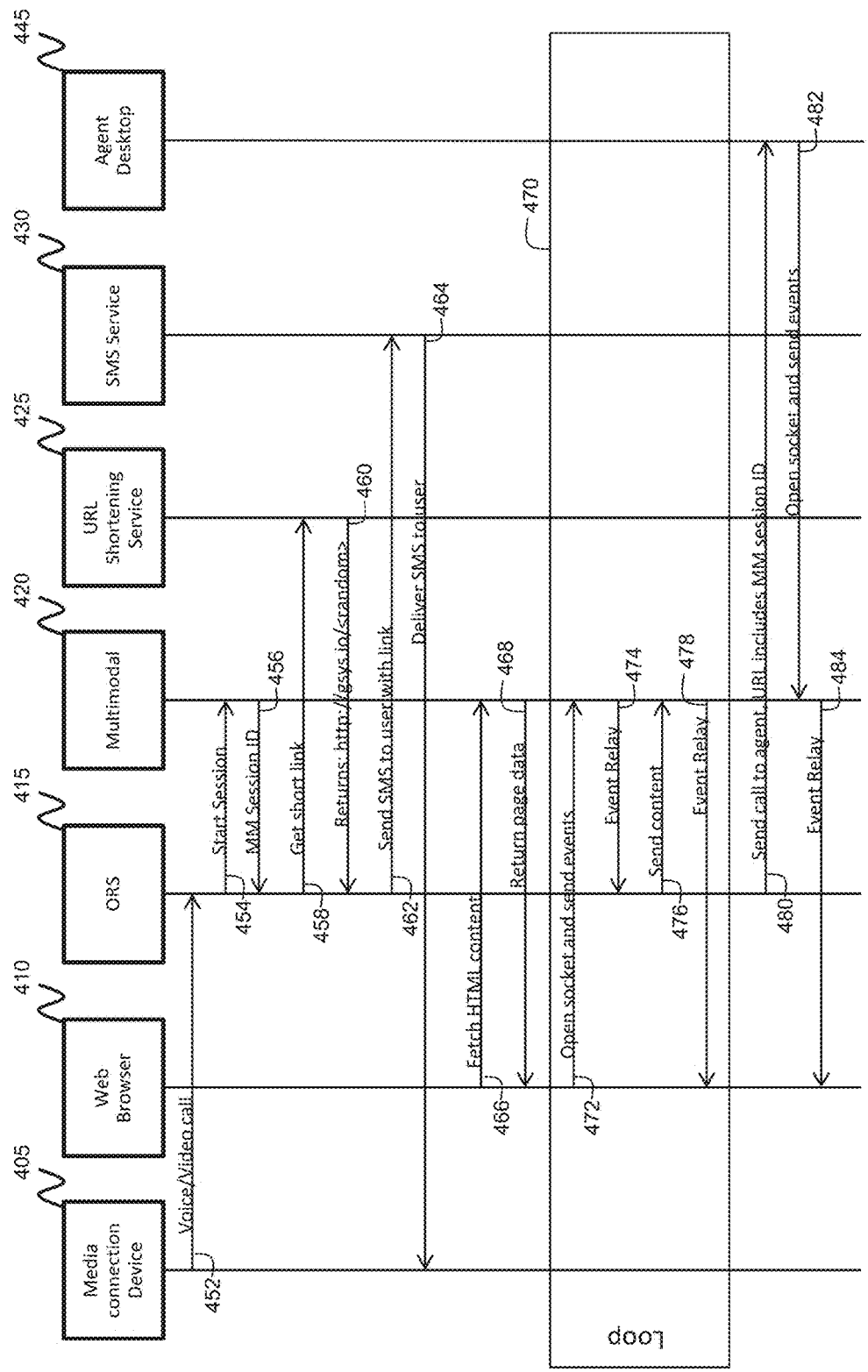
FIG. 4 is a signal flow diagram of a multimodal interaction according to an exemplary embodiment of the present invention.

FIG. 4 is a signal flow diagram of a multimodal interaction according to an example embodiment of the present invention. Referring to FIG. 4, a user places a voice/video call at act 452 to the contact center via a media connection device (e.g., a mobile phone or a LAN line phone) 405, and in response, an orchestration module 415 (which may be similar to the orchestration module 230) creates a multimodal session at act 454 via a multimodal server 420 (which may be similar to the multimodal server 125).

The multimodal server 420 returns a multimodal session ID at act 456 to the orchestration module 415. The orchestration module 415 requests a short link URL at act 458 from a URL shortening service 425, and the URL shortening service 425 generates and returns the short link URL at act 460.

The orchestration module 415 sends an SMS with the short link URL at act 462 to an SMS service 430, and the SMS service 430 delivers the SMS at act 464 to the user's media connection device 405. According to one embodiment, the SMS service is provided by the mutimedia/social media server 154.

In this example embodiment, the user proceeds to enter the short link URL into a web browser 410. The web browser may be running on the same device as that of the media connection device or may be on a different device.

The web browser 410 fetches HTML content at act 466 from the multimodal server 420, and the multimodal server 420 returns page data at act 468 to the web browser 410. Here, for example, the page data may be pushed as java script based on AngularJS framework.

A loop is invoked next at act 470, during which the web browser 410, for example, opens an event routing bus (e.g., CometD socket or the like) and sends response events at act 472 to the multimodal server 420. The multimodal server 420 relays the events at act 474 to the orchestration module 415. Upon receiving further instructions from the conversation manager based on context of the events, the orchestration module 415 sends content at act 476 according to the instructions to the multimodal server 420. The multimodal server 420 transforms the content into a format to be displayed on the web browser 410, and sends the content at act 478 to the web browser. The events between the web browser 410 and the multimodal server 420 are exchanged during the loop 470.

In this example, at some time after exchanging events, the user requests to be connected to a live agent 445. In response, the orchestration module 415 forwards the interaction to the live agent 445 including the URL and multimodal session ID at act 480.

An event routing bus (e.g., CometD socket or the like) is opened between the live agent's desktop 445 and the multimodal server 420, and the live agent 445 sends events at act 482 to the multimodal server 420. The multimodal server 420 relays the events at act 484 to the web browser 410. Here, the process continues between the user and the live agent until at least one of the two modalities are terminated.

While FIGS. 2-4 illustrate some combinations of interactions and use cases exemplifying multimodal interaction capabilities in the call center environment, there may be many other combination of interactions and use cases that will be apparent to a person of skill in the art that are covered by the described embodiments. For example, in some embodiments, the contact center may deflect at least some incoming calls to an online self service or a non-telephony based modality in the event that the voice communication channel is overloaded.

In some embodiments, a user may be interacting with a contact center resource via voice or video call, for example, to troubleshoot some technical issue, and the user may be sent an online instructional video to walk the user through the process of troubleshooting the issue.

In some embodiments, the user may be having issues with, for example, his or her internet service, and the user may be provided with a link with instructions with step by step fault diagnosis, while the orchestration module invokes a backend system (e.g., a business support system 245) to run diagnosis to check the connection to the user's modem.

In some embodiments, the user may want to active his or her credit card and may engage in a multimodal interaction for complex form filling while being given step by step voice instructions for filling out the forms.

In some embodiments, the user may wish to utilize a visual channel to input data (or events), when the user is having issues with inputting the data via the voice IVR.

In some embodiments, a multimodal interaction may be utilized for multi factor authentication, for example, by requesting authentication or identification information over voice, and additional authentication or identification data over another medium, such as a mobile application (e.g., to provide a fingerprint).

In some embodiments, the contact center system may identify that the user is interacting with a website associated with the contact center through the desktop web 225, and based on the user's activities at the website, the user may be offered an opportunity to interact with a contact center resource (e.g., an agent or a self-help system) via a text, receive a callback from the contact center at a time convenient for the customer and/or the contact center, initiate a voice IVR by calling (e.g., click to call) into the contact center, etc.

In some embodiments, the system may identify preferences of the user, user's channel capabilities, contact center capabilities, and/or the like, and provide the opportunity to interact based on the user's preferences, user's capabilities, and/or contact center capabilities.

In some embodiments, the user may switch from one communication channel (e.g., voice) to another communication channel (e.g., chat), and may resume communication via the other communication channel without having to repeat himself or herself. For example, in some embodiments, the user may initiate a first interaction on voice, and may be queued to speak to a live agent. In this case, a threshold wait time for the queue may be higher than an acceptable threshold wait time, and thus, the user may be offered an opportunity to interact with, or switched to, a live agent on a different modality, for example, such as chat.

In some embodiments, the user may be online (e.g., browsing a website), and may request a callback. In this case, the multimodal system 200 may queue the callback and store a multimodal session associated with the user's online session. The user may receive a popup notification online that the user will receive a callback. The popup notification may include a time when the user can expect the callback. When the callback is placed, for example, via a voice channel, the callback may be associated with the online session through the multimodal session, and the user may continue the online session concurrently with the callback.

In some embodiments, the user may be driving in his automobile, or through an auto-pilot mode in his automobile, and the multimodal system may push content to the user's automobile. The content may be rendered on a display device of the automobile, and the user may interact with the contact center via voice through the car or through a mobile phone.

Further, while it has been described with reference to FIGS. 2-4 that the user is connected to the subsequent modality via the link sent over SMS or PUSH notification, there may be various methods for authenticating the user to connect the user to the correct multimodal session. The various methods may be used singularly or in any combination with each other. For example, in some embodiments, the user may be provided a temporary access number (TAN) in the form of a telephone number, for example, to initiate a second interaction via voice/video. In an embodiment, the orchestration session may be established, and the TAN may be allocated to the orchestration session. When the user dials the TAN, the orchestration session may be matched with the TAN. In another embodiment, the TAN may be established without the orchestration session, and some data corresponding to the first modality may be associated with the TAN. In this case, when the user dials the TAN, a new orchestration session may be created, and the first modality may be related to the new orchestration session. In another embodiment, if the first modality is associated with a web session, the TAN may be associated with the web session, and when the user dials the TAN, the system may look-up any web sessions associated with the TAN. While the TAN in the above examples have been described as a telephone number, it may be any unique identifier that is used by the user to establish the other modality.

In some embodiments, the system may place a cookie in the user's browser to identify the user via the cookie when the user is browsing a corresponding website. For example, the cookie may include some identifying data of the user (e.g., the user's phone number, email address, etc.), so that the system can determine the user's identity via the cookie to connect one modality with another modality. In this case, when the user is browsing the website, the system may identify the user's phone number via the cookie, and when the user calls into the call center with the phone number, the system may match the cookie with the phone number to determine that the user is browsing the website to link the two modalities together. According to one embodiment, the identifying data may be something other than the user's phone number, such as, for example, a hash value of the user's data or another unique ID associated with the user at the contact center side. The identifying data may also be a temporary value that expires after a certain period of time.

In some embodiments, the user may be given a unique code or token to identify the user on a subsequent modality. For example, the user may be prompted to enter the unique code or token when communicating via the subsequent modality. In some embodiments, the unique code or token may have an expiration time to promote the user to communicate via the subsequent modality in a timely manner, and/or to release reserved resources if the user does not initiate communications on the subsequent modality within the expiration time.

In some embodiments, after the user is connected to the additional modality, there may be an additional verification or authentication step to ensure that the user is who he or she claims to be (e.g., prompt the user for password, magic word, fingerprint, security token, etc.).

Communication Medium Switching

While call center agents may have skills to handle multiple media channels (e.g., voice, chat, email, etc.), if one media channel type becomes overloaded, this may be at the expense of other media channel types. For example, when a call center has increased voice calls, all or most agents may be dedicated to handling the voice calls, and may result in few or no agents being available to service other media types. Hence, interactions at the other media types may be ignored, or customers engaged via the other media types may have bad user experiences.

According to one or more embodiments of the present invention, a user waiting to speak with a live agent via one media type may be switched to another media type, for example, to receive faster service. In some embodiments, the user may be provided with the option to switch to the other media type to receive the faster service. In some embodiments, the system may determine the capabilities of the user's device, and may automatically switch the user to the other media type to receive the faster service when it is determined that the user is capable of communicating via the other media type. The other media type that is selected may be based on predictive analytics which is adapted to select a media type that is predicted to provide an optimal business outcome. In some embodiments, a call center resource may be reserved for the other media type for a set or predetermined time in order for the user to switch to the other media type.

In some embodiments, the user may be engaged with a live agent via one media type, and during the conversation, may be switched to a different media type when appropriate or desired. For example, during a conversation with the live agent (e.g., via voice), the user may be asked for some sensitive information (e.g., social security number, credit card number, address, etc.), and it may be more appropriate or desirable for the user to enter the sensitive information via an IVR or via chat, for example. In this case, the user may be switched to the IVR or to chat to enter the sensitive information, and upon submitting the sensitive information, the user may either stay on the IVR or chat or be switched back to the agent for further processing.

In some embodiments, when it is determined that the user will be switched from one medium to another medium, the user may be given a token or some unique identifier to be input when switching to the other medium. This token or unique identifier may have a set or predetermined expiration time to encourage the user to switch mediums within a timely manner, and/or to release an allocated resource for handling the subsequent communications on the other medium if the user does not switch mediums within the set or predetermined expiration time. In some embodiments, the unique identifier may include a TAN, a cookie, a unique code, and/or the like.

Figure 5:
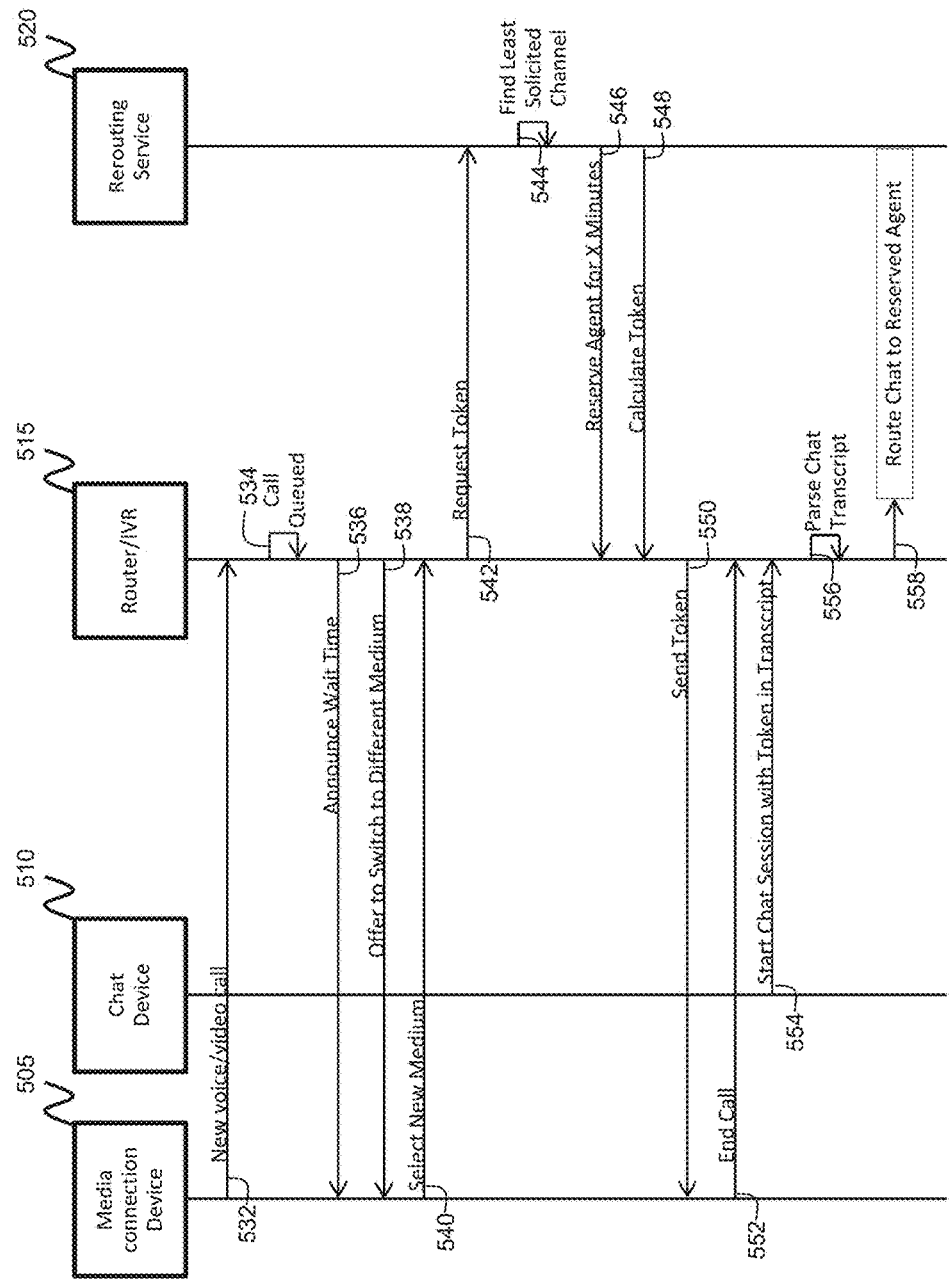
FIG. 5 is a signal flow diagram of dynamic medium switching according to an exemplary embodiment of the present invention.

FIG. 5 is a signal flow diagram of dynamic medium switching according to an example embodiment of the present invention.

Referring to FIG. 5, a user places a voice/video call to the contact center at act 532 via a media connection device (e.g., a mobile phone or a LAN line phone) 505, and thereafter (e.g., after going through an IVR), the router 515 queues the call at act 534 to be connected to a live agent. At act 536 the IVR 515 announces the wait time to be connected to the live agent, and at act 538, offers to switch the user to a different medium, for example, to receive faster service. Information on the estimated wait time may be obtained, for example, by querying the statistics server 132.

At act 540 the user invokes the media connection device 505 which responds to the prompt by the IVR with a command to switch to an alternate communication modality. In response to receipt of the command from the media connection device 505, the router 515 requests a token at act 542 from a rerouting service 520 (which may be similar to the rerouting service 131 in FIG. 1B). At act 544 the rerouting service 520 determines a different media channel (e.g., chat) having a waiting time that satisfies a threshold waiting time, and at act 546 the rerouting service 520 instructs the router 515 to reserve a resource (e.g., a live agent) at the different media channel for some set or predetermined time X. In some embodiments, the set or predetermined time X may be configured to be long enough for the user to switch to the different media channel, but short enough so that the reserved resource at the different media channel is not waiting too long for the user to switch. For example, in some embodiments, the predetermined time X may be greater than or equal to 5 minutes and less than or equal to 30 minutes. In some embodiments, the reserved resource may continue working on other tasks, but may be informed to expect a communication on the corresponding media channel within the predetermined time X. In some embodiments, the predetermined time X may be a prediction when the reserved resource will likely become available.

According to some embodiments, the rerouting server 520 may consider other factors in selecting the other media channel. For example, the rerouting service 520 may be configured to consider business objectives of the contact center to select a media channel that is configured to optimize such business objectives.

At act 548 the rerouting service 520 returns a unique identifier (e.g., a token, a TAN, a cookie, etc.) to the router 515 for the reserved communication at the different media channel, and at act 550, the router 515 sends the unique identifier to the media connection device 505 for storing therein.

At act 552 the user ends the call (e.g., hangs up) and the media connection device 505 in response transmits a corresponding signal to the router 515 to end the call. At act 554, the user starts a chat session via a chat device 510, and includes the token in the chat transcript. In some embodiments, the chat device 510 may be the same device as the media connection device 505. In some embodiments, the media connection device 505 and the chat device 510 may be different devices.

In some embodiments, instead of the user ending the call at act 552, the user may decide to stay on hold during the chat interaction, or may wish to stay in the queue to speak with a live agent while interacting via chat, for example.

At act 556 the router parses the chat transcript to identify the token, and in response to verifying that the chat token is valid and received within the predetermined time X, the router routes the chat to the reserved agent at act 558. In this regard, the routing server 515 routes the chat to the agent that has been reserved in association with the token.

In some embodiments, the token may be proof that the user has waited at the first medium, and the token may be used to retrieve the context of the user's inputs at the first medium. Further, because the user is rerouted to the second medium, the token may ensure that custom strategies are applied to customize the routing (e.g., fast path without having to repeat context and the like), and the token may include specific information for this purpose.

Figure 6:
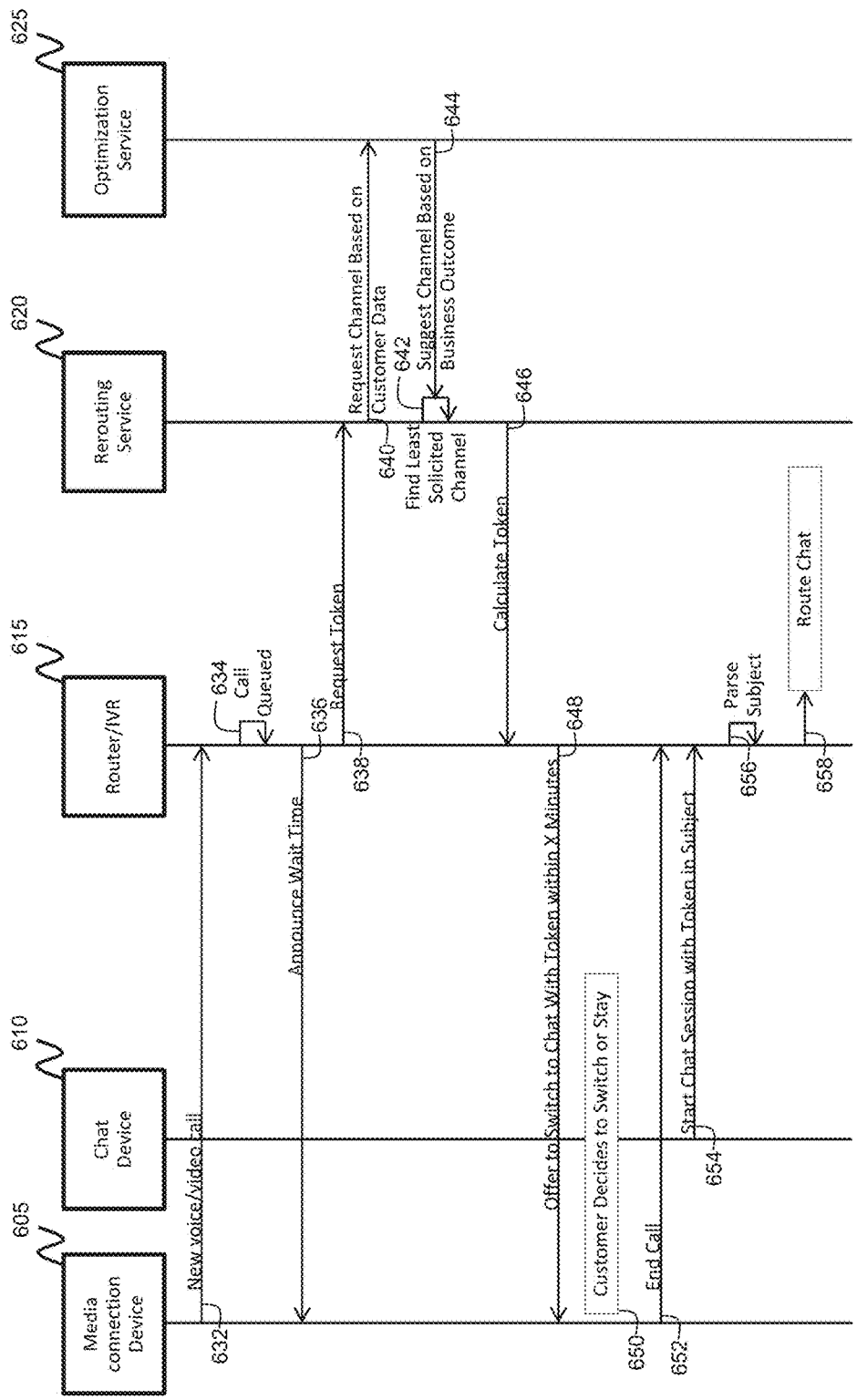
FIG. 6 is a signal flow diagram of dynamic medium switching according to an exemplary embodiment of the present invention.

FIG. 6 is a signal flow diagram of dynamic medium switching according to an example embodiment of the present invention. Referring to FIG. 6, at act 632 a user places a voice/video call to the contact center via a media connection device (e.g., a mobile phone or a LAN line phone) 605, and thereafter (e.g., after going through an IVR), the router 615 queues the call at act 634 to be connected to a live agent. At act 636 the IVR 615 announces the wait time to be connected to the live agent.

At act 638 the router 615 requests a token from a rerouting service 620, and as a result, at act 640 the rerouting service 620 requests an optimal or desired channel based on customer data from an optimization service 625. At act 642 the rerouting service 620 searches for another channel having a waiting time that satisfies a threshold waiting time, during which the optimization service 625 returns a suggested channel based on business requirements at act 644. The logic running on the rerouting service and/or the optimization service 625, which may be hosted in the predictive analytics/optimization server 135 in FIG. 1A, may be similar to or the same as that of the predictive analytics module described in further detail below with reference to FIGS. 9-16.

At act 646 the rerouting service 620 returns a token associated with the determined channel, and at act 648 the router 615 announces an offer to switch to the determined channel (e.g., chat) using the token within a set or predetermined time X. Here, the predetermined time X may be configured to be long enough for the user to switch to the different media channel, but short enough so that the resource at the different media channel is not tied up for too long. For example, in some embodiments, the predetermined time X may be greater than or equal to 5 minutes and less than or equal to 30 minutes. In some embodiments, the resource at the different media channel may continue working on other tasks, but may be informed to expect a communication on the corresponding media channel within the predetermined time X. In some embodiments, the predetermined time X may be a prediction when the resource at the different media channel will likely become available.

At act 650 the customer has the choice to continue waiting in the present queue or to switch to the other channel using the token within the predetermined time X. In this example embodiment, the user decides to switch to the other channel, and thus, terminates the call at act 652. However, the present invention is not limited thereto, and in some embodiments, the user may be placed on hold while interacting via the other channel (e.g., chat), or may continue to wait in the queue while interacting via the other channel.

At act 654 the user starts a Chat session via a chat device 610 while including the token in the subject line. In some embodiments, the chat device 610 may be the same device as the media connection device 605. In some embodiments, the media connection device 605 and the chat device 610 may be different devices.

The router 615 parses the subject line for the token at act 656. When the router 615 determines that the token is valid and received within the predetermined time X, the router routes the chat to a chat queue or directly to a reserved chat agent to be handled by a corresponding or reserved chat agent.

The signal flow diagrams described with reference to FIGS. 5 and 6 are given as examples only, and there may be various combinations of interactions and use cases in which a user is switched from one medium to another medium to resume communications on the other medium. Also, in the embodiments of FIGS. 5 and 6, the logic for dynamic medium switching resides with a router/IVR 515. The router/IVR 515 may be similar to the routing/orchestration server 124 or IMR server 122 of FIG. 1A. However, the present invention is not limited thereto. For example, in some embodiments, the logic for medium switching may reside in the multimodal server 220 (e.g., see FIG. 2), the interaction server 156 (e.g., see FIG. 1A), or any other suitable module or server.

Menu Generation in Self-Service

Embodiments of the present invention are also directed to dynamically generating a menu for an automated self-service that is appropriate for a particular media channel. For example, a voice channel may provide the automated self-service via an IVR, a chat channel may provide the automated self-service via chat robots (e.g. chat IVR), and a web channel may provide the automated self-service via a web application/service. According to one embodiment, each automated self-service includes menus that may offer the user options to navigate through, and/or query or prompt the user to input information. Each menu may contain a set of 0 to n (where n is a natural number) options, and the options may include links to other menus or actions (e.g., get input, transfer user, play text, and the like).

According to one embodiment the menus are generated at a central server and/or via central logic for various communication channels, without the need to invoke a separate server or logic dedicated to a particular communication channel. Such central server and/or logic is referred to herein as a universal menus service 710. The menus that are generated by the central server provide a consistent/unified navigation of the menus regardless of the media channel being used, for providing users a seamless user experience regardless of the modality being used.

According to one embodiment, the universal menus service 710 is configured to determine the capabilities/limitations of the medium for which a self-service menu is to be generated, and generate menu items that are appropriate for the particular modality. For example the option to "press 1" to invoke a particular functionality has no meaning in a chat or web IVR. Accordingly, for a web IVR, the option may instead provide a hyperlink, and instruct the user to "select the hyperlink" to invoke the same functionality.

In this regard, the universal menus service 710 applies rules to dynamically adjust content of the menus. For example, one set of rules may cause unnecessary menus to be removed for particular mediums, and another set of rules may be used to transform the menu options for the appropriate modality (e.g. transform the menu options to hyperlinks for web IVRs, but to numbered choices for voice IVRs). In this regard, tags or metadata may be used to generate the appropriate menu content.

According to some example embodiments of the present invention, when a user switches from a self-help service on one media channel to that of another media channel, the universal menus service may offer the same or substantially the same navigation (including menu structure, hierarchy, nesting, and the like) across the different media channels, and may adapt menus according to the specific capabilities of the media channel (e.g., by dynamically adding, removing, and/or changing the menus appropriately for the media channel). For example, after switching media channels, the user may go back one step on the new media channel and find the same or substantially the same menu as that of the previous media channel, but which has been adapted for the new media channel.

Figure 7:
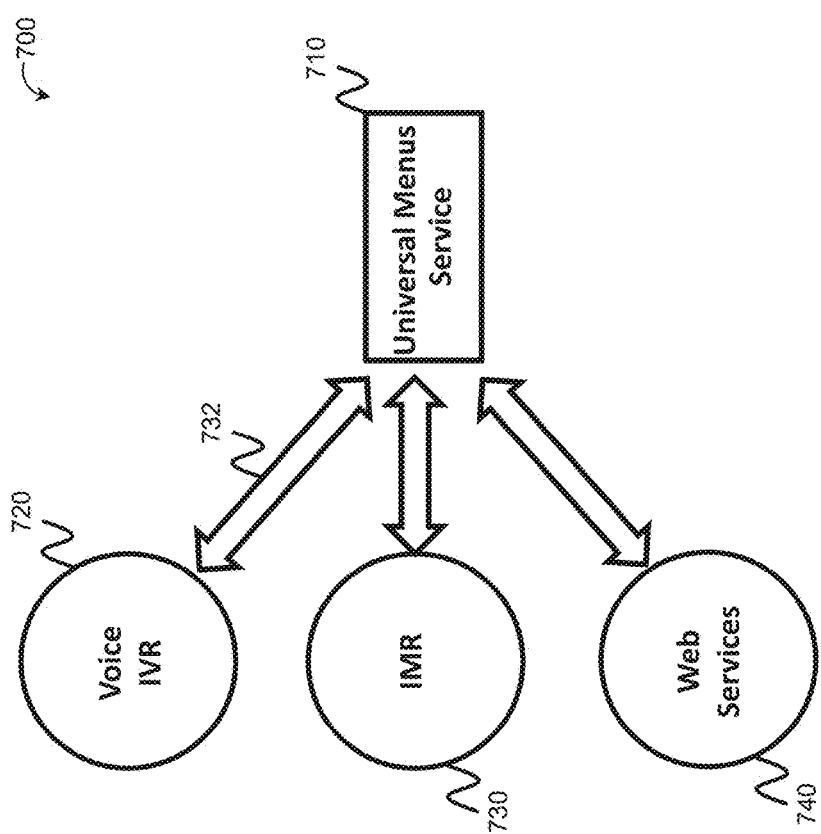
FIG. 7 is a general architectural diagram of a universal menus system, according to an exemplary embodiment of the present invention.

FIG. 7 is a general architectural diagram of a universal menus system 700, according to an example embodiment of the present invention. The system includes a universal menus service 710 which may be a separate service/module that may run on a dedicated server. However, the present invention is not limited thereto, and in some embodiments, the universal menus service may be a logical portion of the orchestration server 124, multimodal server 125, conversation manager 240 (e.g., see FIG. 2), or any other suitable service/module. For example, the universal menus service 710 may be similar to the universal menus module 129 hosted in the orchestration/routing server 124 of FIG. 1B.

According to one embodiment, the device providing a particular self-service, such as, for example, voice IVR 720, IMR 730, and web server 740, is connected to the universal menus service 710 over a data communications network 732. Each device providing the self-service receives configuration information from the central universal menus service 710 regardless of the communication modality in which the self-service is provided. Based on the configuration information, the self-service device generates, for example, the menu appropriate for the communication modality that is to be used to provide the self-service. The configuration information may be catered to the communication modality in which the self-service is to be provided, and capabilities of the communication modality.

According to an embodiment, the universal menus service 710 may be configured to receive data from the various self-service devices related to usage of the self-service menus, and/or user preference data. The universal menus service 710 may use the data to adapt content and/or layout of the menus. For example, taking the case of the voice IVR, the voice IVR may track which menu options are being used more often, and provide such usage data to the universal menus service 710. Based on the usage statistics, the universal menus service 710 may change the configuration data for the voice IVR to change the order of the menu items (e.g., putting the most used menu item first on menu).

According to an embodiment, the universal menus service 710 may adapt content of the menus based on capacity of the call center. For example, if no agents are currently available, the menus on the relevant communication channels may be adapted so that an option to be transferred to an agent is not given. In some embodiments, if no agents are currently available for a particular medium, and it is determined that an agent for another medium is available, the menu may be adapted to add an option to transfer to the available agent in the other medium.

According to an embodiment of the present invention, the universal menus service 710 may act as a repository of menus. According to one embodiment, the menus may be described as sets of structured data that are enhanced with metadata to make them medium aware. The menus may be defined in JSON code with an array of objects, and each object may define its content (e.g., options and the like) and metadata. For example, media aware metadata may be represented as a list of supported media at the menu level, and may be defined by the following JSON code (see media tag):

```
{
    'name' : 'main',
    'isDefault' : true.
    'media' : [
        'voice', 'chat', 'email'
    ]
    'options' : [
        {
            'id': '1',
            'action' : 'menus',
            'text' : '{press} {[id]} {to} get support',
            'target': 'support_1'
        },
    ]
}
```

A rule may be applied to a particular menu option so that the appropriate content is output based on the metadata, predefined tag, and/or any other suitable logic. For example, a simple menu structure and tags may be defined by the following JSON code:

```
var menus = [{
        'name' : 'main',
        'isDefault': true,
        'options' : [
            {
                'id': '1',
                'action' : 'menus',
                'text' : '{press} {[id]} {to} get support',
                'target': 'support_1'
            },
        ]
}];
```

In the above example, the value of the tags "press [id]" may be selected based on the communication medium on which the menu item is to be provided. For example, if the medium is identified as being voice, the value of the tags "press [id]" may be "press 1." However, if the medium is identified as being the web, the value of the tags "press [id]" may be "select option 1," where option 1 may be rendered as a hyperlink.

Figure 8:
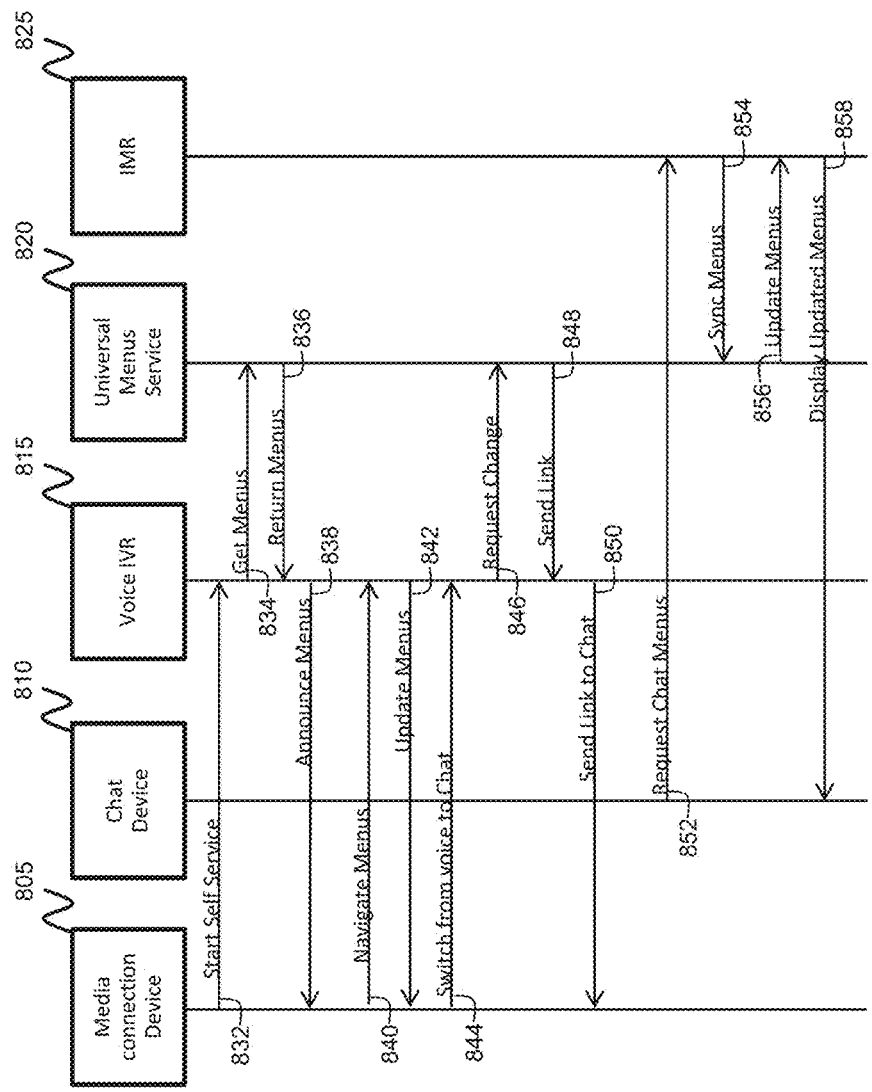
FIG. 8 is a signal flow diagram of dynamically adjusting menus in a self-service system across different media channels, according to an exemplary embodiment of the present invention.

FIG. 8 is a signal flow diagram of dynamically adjusting menus in a self-service system across different media channels, according to an example embodiment of the present invention.

Referring to FIG. 8, at act 832 the user places a telephony call to a call center by invoking a media connection device (e.g., a mobile phone or a LAN line phone) 805. The call is routed to a voice IVR 815 by the routing server 124. The voice IVR 815 may be similar to the IMR server 122 of FIG. 1A.

In response to receipt of the call, the voice IVR 815 transmits, at act 834, a request to the universal menus service 820 (which may be similar to the universal menus module 129 of FIG. 1B) for an appropriate self-service menu. The universal menus service receives the request and determines that the request was transmitted by a voice IVR. In response to the determination, the universal menus service 820 retrieves appropriate content for the menu items that are tagged in the retrieved menu structure, and generates the menu with the appropriate content.

At act 836 the universal menus service 820 returns the menus to the voice IVR 815 as, for example, a voice XML script, and the voice IVR 815 executes the script to announce the menus to the user via the media connection device 805 at act 838.

At act 840 the user navigates the menus, for example, by speaking or entering a number or option from the menus, and the voice IVR 815 updates the menus according to the navigation at act 842.

At act 844 the user decides that he or she would like to switch from voice to chat, for example. As a result, at act 846, the voice IVR 815 transmits a request to change mediums to the universal menus service 820. In some embodiments, the change request may include location information and session information (e.g., session ID) for the voice interaction with the voice IVR 815, and information on a current location of an IVR tree being traversed by the user. The universal menus service synchronizes the menus for the voice IVR 815 with an IMR (e.g., a chat IVR) 825, and initiates a chat session corresponding to the session information with the IMR 825.

At act 848 the universal menus service 820 sends a link for the chat session to the voice IVR 815, and at act 850 the voice IVR 815 sends the link to the media connection device 805. For example, the link may be sent via SMS, email, PUSH notification, etc.

The user starts the chat session via the link from a chat device 810, and at act 852, the chat device 810 requests chat menus from the IMR 825. In some embodiments, the chat device 810 may be the same device as the media connection device 805. In some embodiments, the media connection device 805 and the chat device 810 may be different devices.

At act 854 IMR 825 requests synchronized menus from the universal menus service 820. In some embodiments, the IMR 825 retrieves information about the user and requests context of the user's inputs during the voice IVR session identified by the session ID. Thus, the menus in the IMR 825 may be updated based on the capabilities of the IMR 825 and user context input during interactions at the voice IVR 815.

At act 856 the universal menus service 820 provides updated menus to the IMR 825. In some embodiments, the universal menus service 820 retrieves current position of the user in the hierarchy of the menu from the interaction at the voice IVR 815, and sends back the menu that has been formatted for chat. As a result, at act 858, the IMR 825 displays the menus on the chat device 810 at a position in the menu that the user was at for the voice IVR session.

Predictive Channel Determination

As discussed above, in various embodiments of the present invention, the user may interact with one or more contact center resources through multiple mediums concurrently, or may switch between mediums during related but separate interactions. There may be various suitable methods and use cases to determine the desired medium to engage with the user. For example, in some embodiments, determining the desired medium to engage with the user may simply be providing the user a list of mediums to choose from. In some embodiments, determining the desired medium may be based on available resources in the contact center, and/or a desired business outcome for a selected medium. In some embodiments, capability of the user's device may be determined, and based on the capabilities, the user may be engaged via a corresponding medium or may be asked to switch to the corresponding medium. In some embodiments, it may be determined that the user is already engaged via another medium, and the mediums may be linked together.

According to an embodiment of the present invention, the desired medium to communicate with the user may be based on predictive analytics. Predictive analytics may be performed by an intelligent automated system that is configured to dynamically pick a recommended interaction channel for communicating with the customer. According to one embodiment, the channel may be selected in real-time (e.g. when a customer is currently engaged with the contact center via a communication medium), or off-line (e.g. when the customer is not currently engaged in a communication with the contact center).

Figure 9:
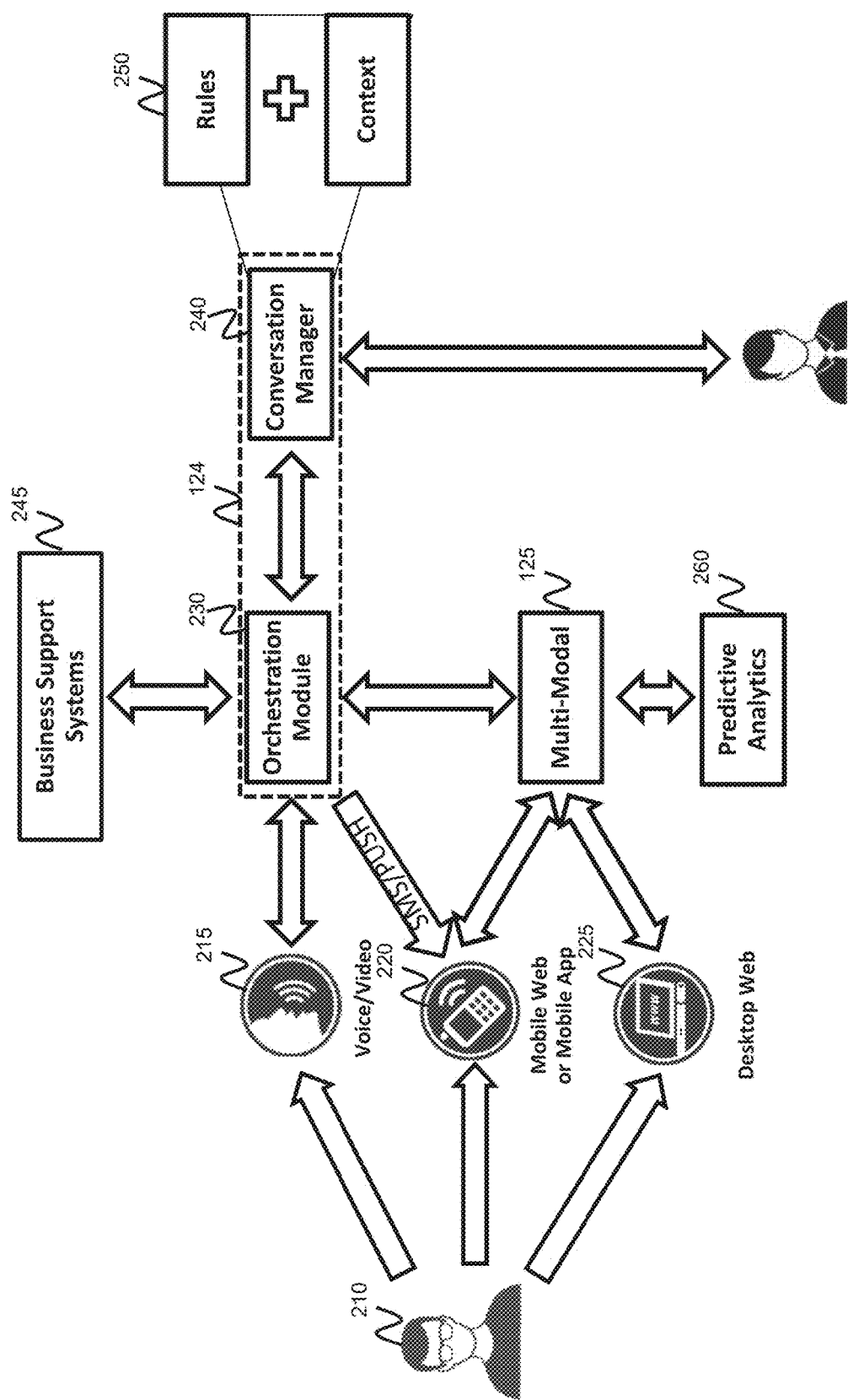
FIG. 9 is schematic diagram of certain components of the contact center system of FIGS. 1A and 1B, for providing multimodal/omnichannel interaction capabilities with predictive analytics according to an exemplary embodiment of the present invention.

FIG. 9 is schematic diagram of certain components of the contact center system of FIGS. 1A and 1B, for providing multimodal/omnichannel interaction capabilities with predictive analytics according to an example embodiment of the present invention. The system of FIG. 9 is substantially the same as the system of FIG. 2, except that FIG. 9 includes a predictive analytics module 260 (which may be hosted on the predictive analytics/optimization server 135 in FIG. 1A) for selecting a communication channel for a customer for either switching the customer to the selected channel, or initiating an interaction in the selected channel. The elements and components in FIG. 9 that are the same or substantially the same as those shown in FIG. 2 are represented with the same reference numbers, and therefore, detailed description of those components will not be repeated.

While the predictive analytics module 260 in the example embodiment of FIG. 9 is shown as a separate module or service connected to the multimodal server 125 for convenience, the present invention is not limited thereto. For example, the predictive analytics module 260 may be coupled to other components of the contact center system. The predictive analytics module 260 may also be implemented as a logical portion of another service or module (e.g., as a logical portion of the multimodal server 125, orchestration server 124, or other servers of the contact center system). According to one embodiment, the predictive analytics module 260 may be hosted on and may be similar to the predictive analytics/optimization server 135 of FIG. 1A.

Referring to FIG. 9, the predictive analytics module 260 is configured to recommend a communication medium for engaging the customer 210 in that medium. The recommendation may be triggered, for example, in response to the customer initiating a request for interaction. The request may be for a particular mode of communication (e.g. voice, chat, text, web interaction, or the like). In response to the request, the orchestration module 230 is invoked (e.g. by the call controller for a voice interaction request), to route the interaction to a resource associated with the particular medium. According to one embodiment, the orchestration module 230 invokes the predictive analytics module 260 for determining whether there is another, more preferred medium for interacting with the customer. The other medium may be one that is deemed to achieve a goal of the contact center (e.g. a threshold resolution time) better than the current medium.

According to one embodiment, the predictive analytics module 260 is configured to collect data from various external and internal sources, and generate a multimodal predictive model for determining, for example, an optimal communication channel to engage with the customer 210. According to one embodiment, an optimal channel is one that is determined, based on the predictive model, to render an optimal reward for the contact center, customer, or a combination of both. For example, the optimal channel may be one that is predicted to optimize business objectives, goals, rewards, or payoffs (collectively referred to as a "reward."). An exemplary business objective that may be optimized may be a key performance indicator (KPI) such as, for example, conversion rate, time to resolution, and the like.

Another trigger for invoking the predictive analytics module 260 may be based on determining that a prospective communication is to be conducted with the customer. For example, the customer may be subject to an outbound campaign, a callback request, and/or the like. The predictive analytics module 260 may recommend an optimal communication medium for the prospective communication.

The external sources providing data to the predictive analytics module 260 may include, for example, contact activity of the customer 210, social media data, interaction disposition data, and/or the like. The internal sources of data may include, for example, interaction data, customer profile, customer context, agent disposition, call center capabilities, call center load, CRM data, and the like.

Figure 10:
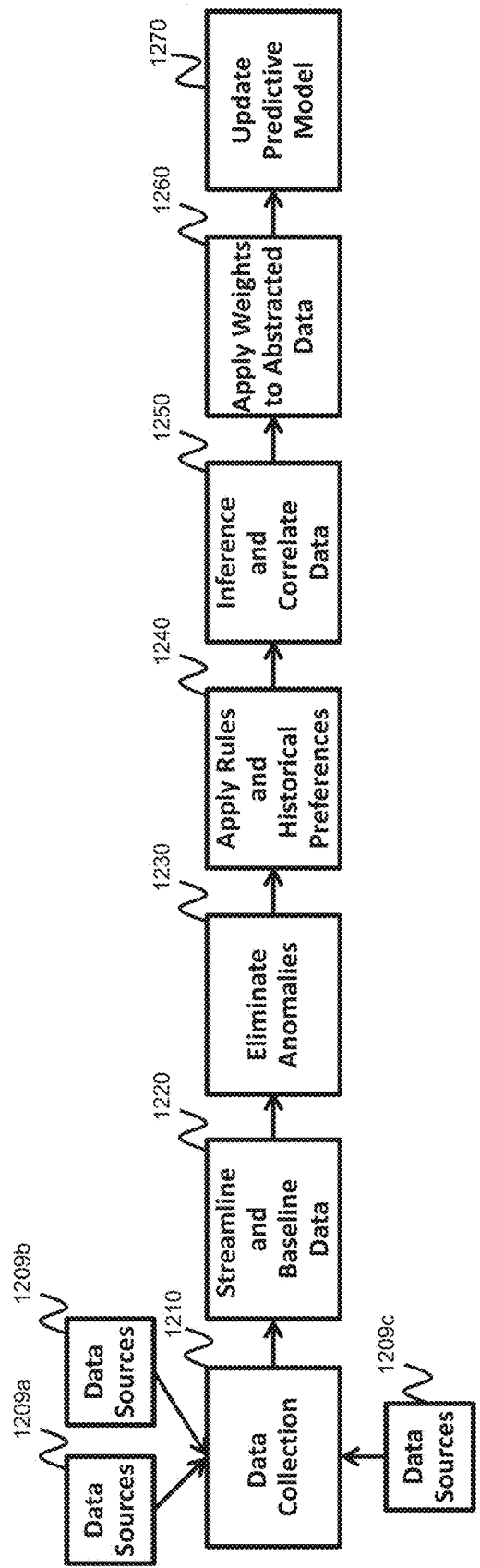
FIG. 10 is a flow diagram of a process for generating and updating a multimodal predictive model according to an exemplary embodiment of the present invention.

FIG. 10 is a flow diagram of a process for generating and updating a multimodal predictive model according to an example embodiment of the present invention. In action 1210, the predictive analytics module 260 aggregates data from various external and internal sources 1209a-1209c. The data may include, for example, contact activity of the customer, social media data, disposition data, interaction data, customer profile, customer context, customer preferences, agent preferences, contact center capabilities, contact center load, statistics, historical data for specific interaction types, and/or the like.

The collected data is streamlined and baselined in act 1220. In this regard, the module 260 streamlines and baselines the data source by, for example, normalizing the units of the various data to a standard set of units (e.g., normalizing data to events per minute, where the original data may have been stored as events per day or minutes per event), normalizing the data to similar ranges (e.g., a value from 0 to 100 or a value from 0 to 255), accumulating or averaging values, and/or the like.

In act 1230, the module 260 cleanses the collected data by, for example, eliminating anomalies. Such anomalies may include, without limitation, redundant data, outliers, unusual data points, insufficient data points, and the like.

In act 1240, the module 260 applies rules and historical preferences to draw correlations and inferences, in act 1250, about the collected data. The process may include, for example, identifying data values associated with certain data (e.g. customer segmentation, call intent, KPI), and relating the values to a communication medium and one or more KPI values. According to one embodiment, a regression analysis may be performed on the collected data for determining the correlations.

In act 1260, weights are applied to the abstracted data. The weights may be utilized by the module 260 to grade (or rank) different data points and elements, and make predictions on rewards to be achieved from using different interaction modalities.

In act 1270, the multimodal predictive model is updated (or generated for the first time if it does not already exist). The model may then be applied for recommending a particular interaction medium for interacting with a customer.

Table 1 is a table with exemplary data points gathered from the data sources 1209a-1209c relating to different customer segments, and associated weights that may be given to the various customer segments.

TABLE 1

Customer Segmentation

| Customer Segment | Service Objective | Criticality Rules | Priority & Assurance | Service Agreements | Best Fit |
|---|---|---|---|---|---|
| Type_1_Segment | Weightage # | Type_1_Rule | Segment specific | Defined SLA by Segment | Hierarchical list of Ixn types |
| Type_2_Segment | Weightage # | Type_2_Rule | Segment specific | Defined SLA by Segment | Hierarchical list of Ixn types |
| Type_3_Segment | Weightage # | Type_3_Rule | Segment specific | Defined SLA by Segment | Hierarchical list of Ixn types |
| Type_4_Segment | Weightage # | Type_4_Rule | Segment specific | Defined SLA by Segment | Hierarchical list of Ixn types |
| Type_5_Segment | Weightage # | Type_5_Rule | Segment specific | Defined SLA by Segment | Hierarchical list of Ixn types |

In the above example, data sources may be segmented based on type (e.g., customer segment), status (e.g., gold, silver, etc.), region, point of entry, business dealings, and the like. The segmentation may provide structure and insight into specific customer types, and may be utilized to define or derive analytics based on such customer segment. The service objective for a corresponding customer type may be defined or derived from business rules to manage and maintain the customer experience according to segmentation and expectations. The criticality rules may define business rules or other criteria and conditions associated with a corresponding customer segment. Priority & assurance refers to interaction priority management for a corresponding customer segment and assurance defined in the rules for these customers for adherence purposes. Service agreements are preset agreements defined for corresponding customer segments, and interactions may be managed according to these preset agreements. Best fit is data that is derived by the predictive analytics module 260 and defines the best fit interaction type for a corresponding customer segment as defined by historical data, events, and customer interaction data and results.

Table 2 is a table with exemplary data points gathered from the data sources 1209a-1209c relating to different customer profiles, and associated weights that may be given to the various customer profiles.

TABLE 2

Customer Profile Weight

| Customer Profile ID | Agreements & Service assurance | Fraud Alert | Repeatability & affinity to Inx type | NPS | Probability Stay/Renew/Cancel | Conversation Ranking | Service Timeline | Interaction Ranking |
|---|---|---|---|---|---|---|---|---|
| CRMAlphaNumberic # | Customer specific by IXN | Flags | Weightage by IXN type | Scores | Predictive scores | Rankings based on touchpoints | Ixn touchpoints & expectancy | Rankings based on previous results |
| CRMAlphaNumberic # | Customer specific by IXN | Flags | Weightage by IXN type | Scores | Predictive scores | Rankings based on touchpoints | Ixn touchpoints & expectancy | Rankings based on previous results |

TABLE 2-continued

Customer Profile Weight

| Customer Profile ID | Agreements & Service assurance | Fraud Alert | Repeatability & affinity to Ixn type | NPS | Probability Stay/Renew/Cancel | Conversation Ranking | Service Timeline | Interaction Ranking |
|---|---|---|---|---|---|---|---|---|
| CRMAlphaNumberic # | Customer specific by IXN | Flags | Weightage by IXN type | Scores | Predictive scores | Rankings based on touchpoints | Ixn touchpoints & expectancy | Rankings based on previous results |
| CRMAlphaNumberic # | Customer specific by IXN | Flags | Weightage by IXN type | Scores | Predictive scores | Rankings based on touchpoints | Ixn touchpoints & expectancy | Rankings based on previous results |
| CRMAlphaNumberic # | Customer specific by IXN | Flags | Weightage by IXN type | Scores | Predictive scores | Rankings based on touchpoints | Ixn touchpoints & expectancy | Rankings based on previous results |

In the above example, customer profile ID is the customer identification that may be used across all relational data objects to identify customer, type of customer, and customer segmentation based on various criteria, for example, size of the business, frequency of the business, type of the business, etc. This information may be related to various other aspects of customer related data. Agreements & service assurance may define customer channel preferences, current channel capabilities, and registered devices. Fraud alert may indicate security flags for customer accounts, thereby alerting the system to take action for further verification to resolve potential fraud issues. Repeatability & affinity to interaction type allows the system to keep track of the preferred channels for customers and the relative number of interactions, date of the interaction, time of the interaction, etc., and is used to predict the best interaction type to engage with the customer based on date, time, and preferred devices. NPS refers to average "Net Promoter Score," which is provided by specific customers, allowing the system to improve the customer experience and to improve the promoter score based on business rules relating to the score levels. Probability stay/renew/cancel refers to the customer's predictive score on the probability of the customer renewing or canceling a corresponding service, and may be updated by the system based on various criteria related to customer profile, history of interactions, and the outcome of these interactions. Conversation ranking refers to relational scores based on previous dialogue/conversation history with the customer. Service timeline refers to customer that are segmented based on different criteria including the amount of business that they bring in. Interaction ranking refers to the quality of interactions ranked based on previous conversations, and several quality systems may contribute to interaction ranking with the customer.

Table 3 is a table with exemplary data points gathered from the data sources 1209a-1209c relating to other types of observations, and associated weights that may be given to the various data.

TABLE 3

Data Capture & Enrichment
Enrichment matrix and weightage for unstructured data

| Data & Process Security by Interaction type | Fraud Detection (Weightage) | Network status and Availability (Weightage) | Interaction type availability (Weightage) | Threat Level (Weightage) | Defined alternatives (Weightage) |
|---|---|---|---|---|---|
| Operations Data and Results by interaction type | Classification based on disposition (Weightage) | Success rates on different channel (Weightage) | Reason for Failure on channels (Weightage) | Anomalies by IXN (Weightage) | Rule optimization (Weightage) |
| Statistics across objects | Service Level (Weightage) | Threshold alerts (Weightage) | WFM availability/capacity (Weightage) | Success rate of IXN (Weightage) | Original IXN Stats (Weightage) |
| Organization Knowledge | Pre-defined Org rules (Weightage) | Engagement requirement (Weightage) | Role and responsibilities (Weightage) | Success rate by business group (Weightage) | Hit rate (Weightage) |
| Cost Analysis | Opportunity cost (Weightage) | Engagement cost (Weightage) | Inx Cost (Weightage) | Probability (Weightage) | OPEX (Weightage) |
| Results | Resolution weight based on repeatability (Weightage) | Revenue loss/gain (Weightage) | Baselines (Weightage) | Stats Anomaly (Weightage) | Co-relation with Cost (Weightage) |

Figure 11:
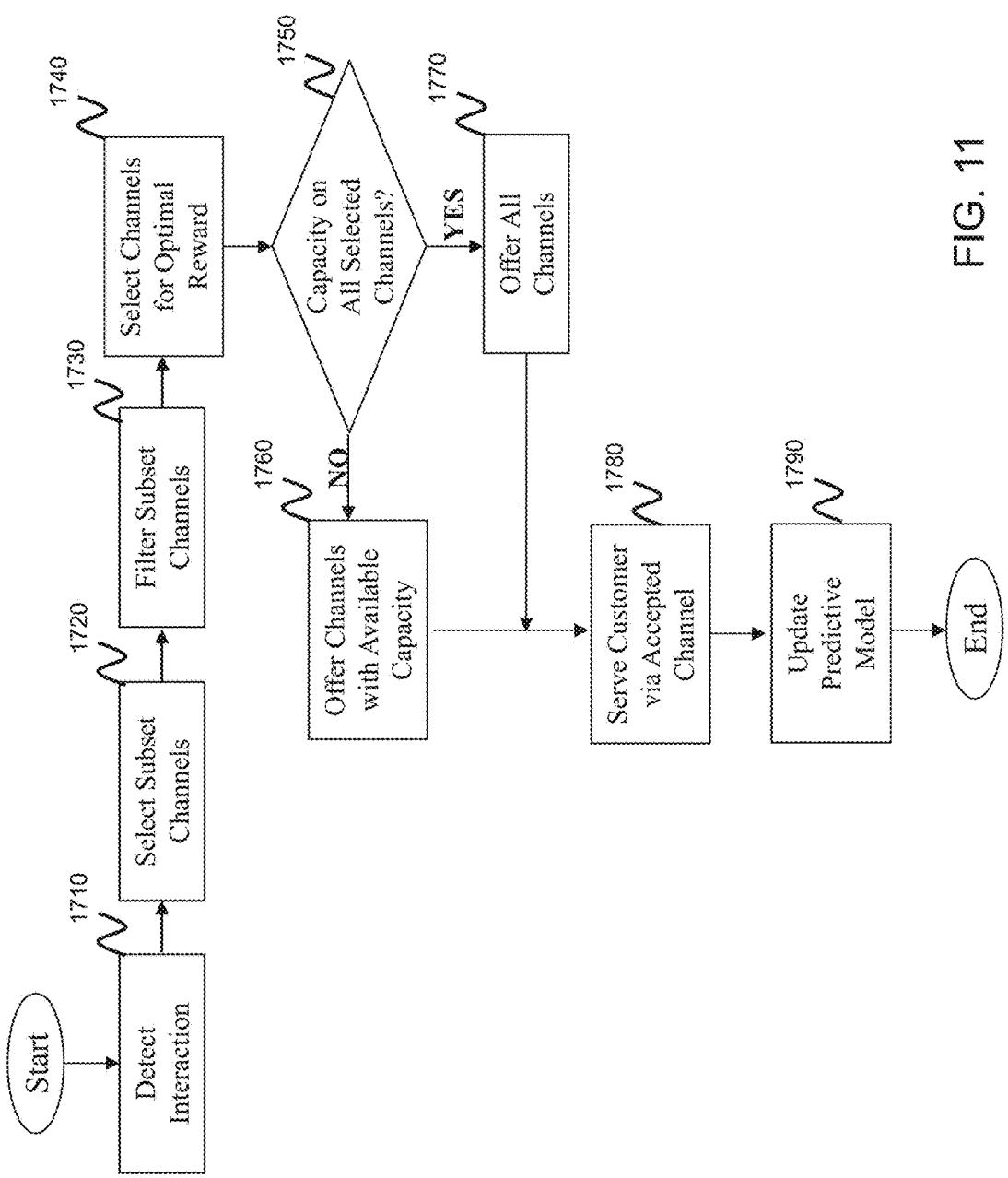
FIG. 11 is a flow diagram of a process for recommending an interaction medium according to one exemplary embodiment of the present invention

FIG. 11 is a flow diagram of a process for recommending an interaction medium according to one example embodiment of the present invention. All or portions of the process may be implemented, for example, by the predictive analytics module 260, or distributed between the predictive analytics module 260 and the multimodal server.

The process starts, and at block 1710, the predictive analytics module 260 detects an interaction that is pending at the contact center, and obtains information about the interaction including, for example, the interaction intent, customer segment of the calling customer, customer profile, current mode of interaction, and/or the like. The interaction may be, for example, a telephony interaction queued at the switch 112 (e.g., see FIG. 1A) to be routed to a contact center resource.

At block 1720, the predictive analytics module 260 selects a possible subset of communication channels that may be recommended based on, for example, service rules, agreements, and/or other constraints (e.g., device type, screen size, geographical location, observed bandwidth or capacity of connection or device, network connection quality, user interaction preferences, and the like). In this regard, certain modalities (e.g. voice, chat, and SMS) may be enabled for certain customer segments (e.g. gold customers) while only a subset of those modalities may be enabled for other customer segments (e.g. bronze customers). In some embodiments, the predictive analytics module 260 may consider the current statistics in the contact center and/or other criteria based on customer segmentation, priority, viability of a successful interaction, and the like, before determining the interactions to engage with. For example, if a customer segment is highly valued (e.g., gold customer), and the current availability for voice agents is low or minimal, the highly valued customer may receive a higher priority or promoted to have a voice engagement with a voice agent, and other customer in lower customer segments in the queue may be reprioritized and/or may be provided an option of self-service or other interaction type that is more viable and manageable at that time.

At block 1730, the predictive analytics module 260 filters the selected subset of channels based on other criteria, such as, for example, a customer's channel preferences, current context of the interaction, customer's device capabilities, and the like. For example, the predictive analytics module 260 may filter out a voice channel if the customer is identified as calling from a publication location, and during the course of the interaction, it is predicted that the customer will have to provide some confidential/secret information. In another example, chat and SMS may be filtered out if the customer is identified as calling from a land line. In a further example, the voice channel may be filtered out if the customer's preference information indicates that he or she wants to communication only via texts.

At block 1740, the predictive analytics module 260 applies the multimodal predictive model to the current observations and selects one or more channels from the filtered subset of channels that are predicted to render an optimal reward for the contact center (referred to as "optimal channels").

At block 1750, the predictive analytics module 260 determines whether or not the contact center has capacity to serve all of the selected optimal channels. Such a determination may be based on agent availability and capacity data provided by, for example, the statistics server 132 (e.g., see FIG. 1A).

If the contact center has capacity to support all the optimal channels, all the channels are offered to the customer in block 1770. If, however, it is determined that the contact center does not have capacity to serve all of the selected optimal channels, only those channels for which the contact center has capacity are offered to the customer. For example, if all agents with a "chat" skill are at their maximum capacity handling other chats, the chat channel is not offered to the customer for selection.

At block 1780, the customer is served via the channel selected by the customer.

At block 1790, the predictive analytics module 260 utilizes information on the business outcome of the interaction for updating the multimodal predictive model.

Figure 12:
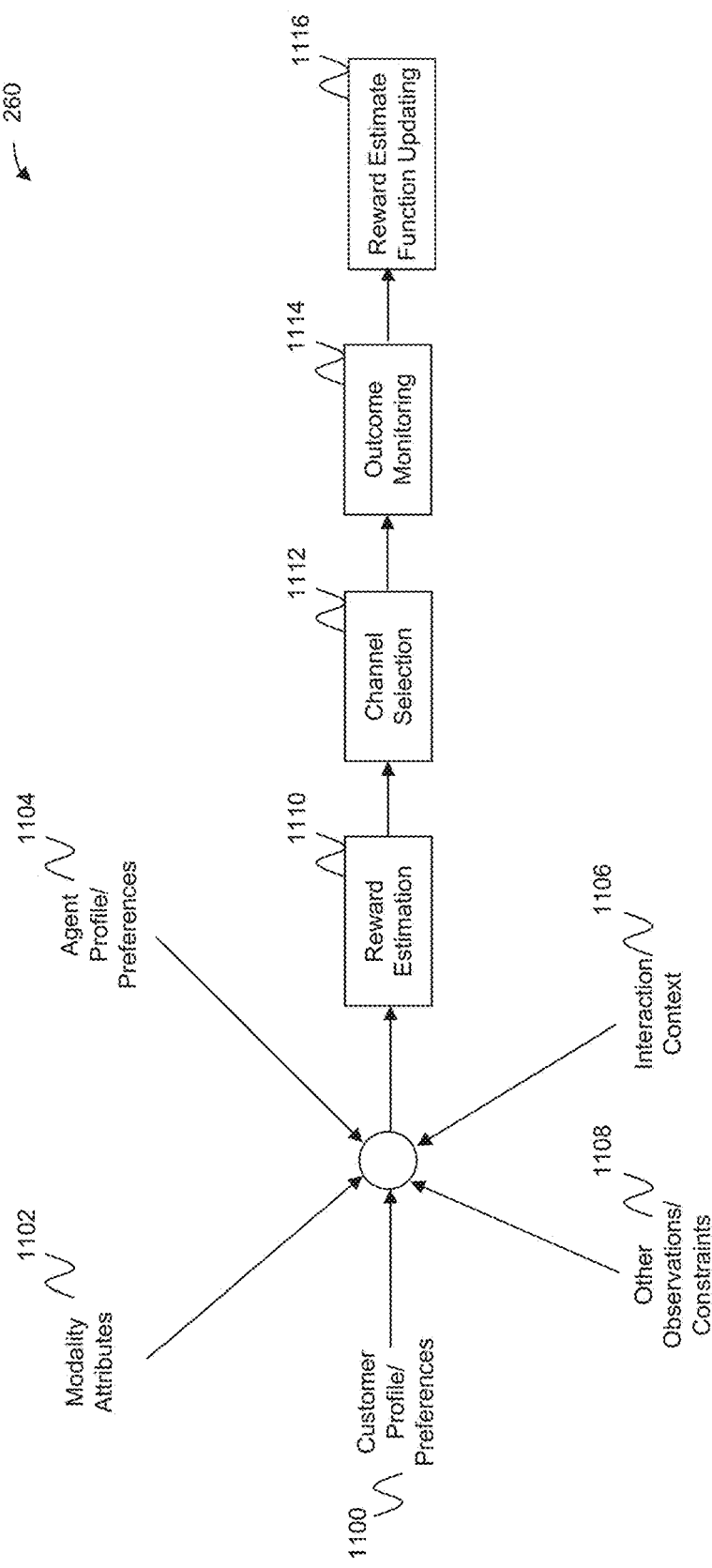
FIG. 12 is a functional layout diagram of the predictive analytics module 260 according to an exemplary embodiment of the present invention.

FIG. 12 is a functional layout diagram of the predictive analytics module 260 according to an exemplary embodiment of the invention. According to this exemplary embodiment, the problem of interaction medium selection/recommendation for long term reward maximization may be formulated as a reinforcement learning problem such as, for example, a "contextual bandits" problem, or more specifically, a k-armed contextual bandit problem known by those of skill in the art. The context or observation includes information on customers, agents, and interactions; the action is the selection of an interaction medium that is recommended to be used in handling the interaction; and the reward is feedback from the environment on completion of the interaction (e.g. value of an achieved goal).

In this regard, the module 260 takes as input various observations about the environment (also referred to as context), including, but not limited to, profile/preference data 1100 of a customer associated with an interaction to be routed, attributes of possible interaction modalities 1102, profile/preference data 1104 of available agents to whom the interaction may be routed, the context of the interaction to be routed 1106 (e.g. customer intent), and other observations and/or constraints 1108 (e.g. service rules/agreements) provided to the module 260. According to one embodiment, the various observations are represented as a multi-dimensional feature vector.

According to one embodiment, customer profile/preference data 1100 may be defined as a set of key/value pairs which is configured to reflect features available about the customer. Exemplary customer profile data include but are not limited to age, gender, language, location, product purchases, affinities, contact info (address, phone, email, social ID), KIout score, business relevant info (family status, hobbies, occupation, memberships, etc.), preferences relating to interaction modalities, usage of the interaction modalities, and the like.

Medium attributes 1102 may be defined as a set of key/value pairs which is configured to reflect attributes of the various interaction modalities. For example, the attributes may identify a particular interaction medium being suitable for text, voice, email, or the like. The medium attributes 1102 may also include information on a suitable service type for a given channel along with appropriate weights that may be refined by customer profiles. The medium attributes 1102 may also reflect combination options (e.g. which channels fit well together). Thus, a particular channel may include, as its attribute a list of other channels with which it is compatible.

Agent profile/preference data 1104 may be defined as a set of key/value pairs which is configured to reflect features available about the agents. The attributes may be global attributes shared by other agents. Such global attributes may include, for example, gender, age, language, skills/channel proficiency, and the like. The attribute may also reflect personal attributes such as, for example, patience, diplomacy, hobbies, and other attributes that may not be exposed by the system as the agent's profile data.

The interaction context 1106, which may be another input to the predictive analytics module 260, may represent the customer intent data. Interaction context may also be defined as a set of key/value pairs. For example, an intent key value pair may be represented as: intent='disputing bill'.

In the various embodiments, the values in the key/value pairs may also be referred to as weights.

According to one embodiment, the gathered observations are input to a reward estimation function 1110. The reward estimation function estimates, for each potential interaction medium, a reward or expected value that is anticipated to be obtained by utilizing the medium in handling the interaction. In this regard, the reward estimation function 1110 is configured to take advantage of knowledge of how a business result (reward) varies for different contexts in order to predict the reward for a particular medium for a current context, and select an interaction medium such that the total reward obtained by the system in the long run is maximized.

According to one embodiment, a reward is an explicit signal from the environment, on completion of the interaction with the customer. The reward may be, for example, fulfilling a business goal including, but not limited to, achieving a desired customer satisfaction, sales revenue, customer effort score, agent effort score, net promoter score (NPS), and/or any other observable outcome obtained at the end of an interaction. For example, the outcome might be provided as part of a customer survey, sales data, and the like.

The reward estimation function 1110 returns the calculated/estimated reward a channel selection function 1112. According to one embodiment, the channel selection function is configured to select a channel based on the estimated rewards. According to one embodiment, the reward estimation function selects an interaction medium with the highest estimated reward. The selected medium may then be offered to the customer for conducting the interaction via this medium. This may entail, for example, starting the interaction with the customer on this medium, or switching an interaction pending on another medium, to the selected medium.

According to one embodiment, an outcome of the interaction measured in terms of the reward that is actually achieved by the interaction, is monitored by a monitoring function 1114. For example, if a sale resulted from the interaction, the monitoring function captures information surrounding the sale such as, for example, sales price, item, time, and the like. The reward that is obtained is the sales revenue resulting from the sale. The reward may also be a customer satisfaction rating, NPS score, customer effort score, and resolution time, first call resolution, and the like.

The actual reward from the interaction may be provided to an updating function 1116 for updating, as needed, the reward estimation function used for the reward estimation. According to one embodiment, a linear regression algorithm is used for learning the reward function based on observed outcomes. The update of the reward function may be done as soon as each outcome is observed, or performed in batch on a periodic basis.

Figure 13:
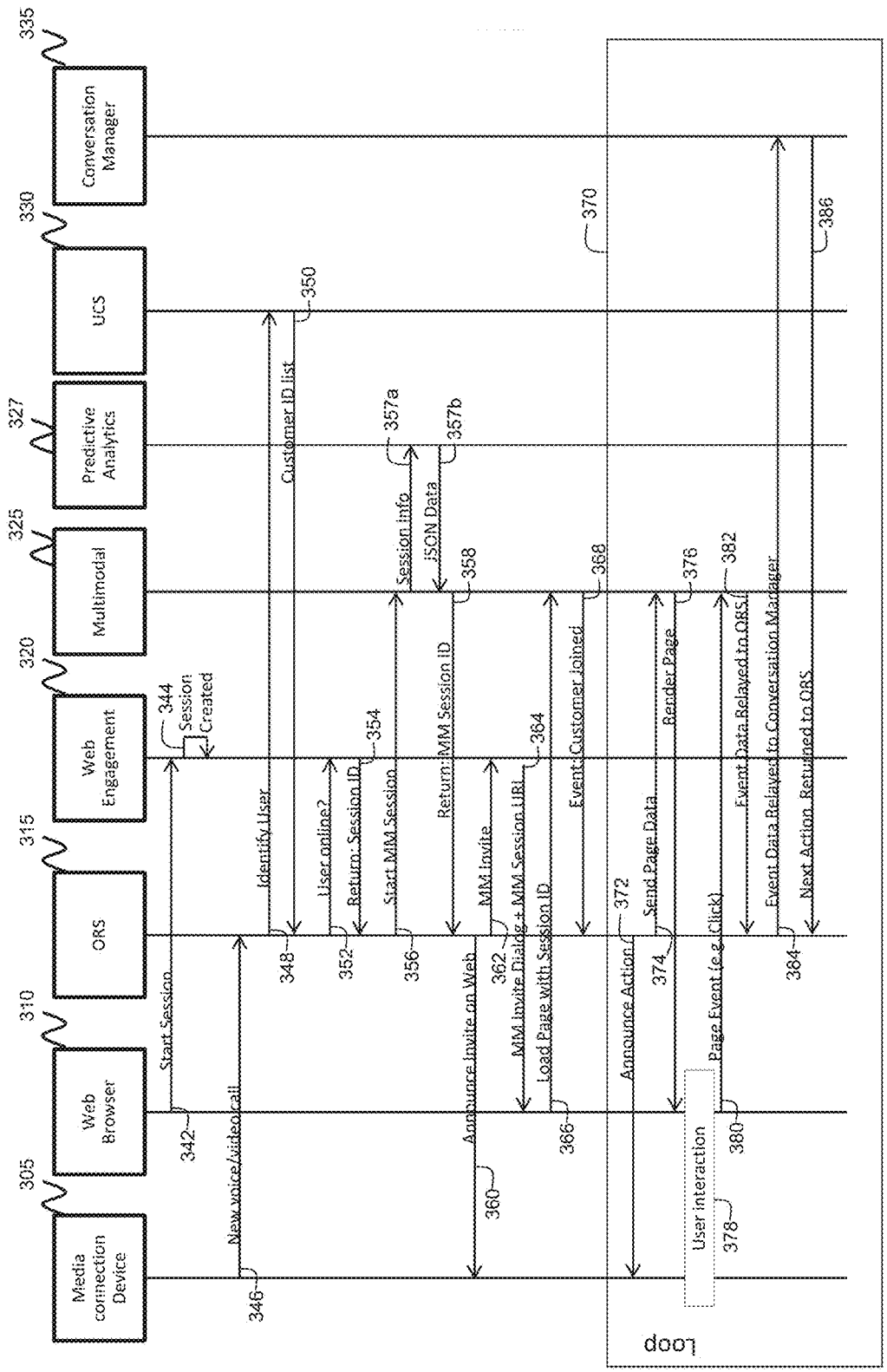
FIG. 13 is a signal flow diagram of a multimodal interaction according to an exemplary embodiment of the present invention.

FIG. 13 is a signal flow diagram of a multimodal interaction according to an example embodiment of the present invention. In FIG. 13, the elements and steps that are the same or substantially the same as those shown in FIG. 3 are represented with the same reference number, and therefore, detailed description thereof may not be repeated.

Referring to FIG. 13, after the system determines that the user is online at act 352 and the multimodal session is started at act 356, at act 357a a multimodal server 325 (which may be similar to the multimodal server 125 of FIG. 2) transmits session information to a predictive analytics module 327 (which may be similar to the predictive analytics module 260 of FIG. 9). The session information may include, for example, customer information, customer segment, customer identification, reasons for the customer interaction, and/or other information obtained from the universal contact sever 330 (which may be similar to the universal contact server 127 of FIG. 1A).

According to one embodiment, the predictive analytics module 327 uses the session information to determine the best or desired modalities to engage with the customer. According to one embodiment, the channel that is selected is one that is predicted to optimize a business outcome of the contact center. In this regard, the predictive analytics module 327 considers elements such as customer segmentation preferences, logical preferences exhibited by the customer in social interactions, historical best hit rate, customer conversion rate, customer mood or personality, statistics collected over time, customer profile, customer capabilities, best or optimal business outcome, call center capabilities, call center load, and/or any other data (e.g., unstructured rich data) collected by the contact center system.

The predictive analytics module 327 returns, for example, JSON data with the best or desired modality to engage with the customer at act 357b, and the multimodal server 325 engages the customer on the desired modality through the orchestration module 315 using the multimodal session ID at act 358. In some embodiments, the multimodal session ID is separate from the online session ID. In this embodiment, context from the first session (e.g., the online session) is associated with the multimodal session to provide data and a uniform experience to the customer across the different modalities.

In some embodiments, a global session ID may be used for purposes of maintaining context across various modalities. Each modality, however, may also have individual channel IDs for reporting, transferring, conferencing, and the like. In some embodiments, there may be a composite ID including the global session ID and individual channel IDs. Context from any session may be associated with each of the other sessions for a corresponding customer so that each of the sessions may be context aware.

For convenience, FIG. 13 shows that it is ultimately decided that the best modality to engage with the customer is web, because the customer is already engaging on web, for example. However the present invention is not limited thereto, and in some cases, there may be a rule or a customer preference that may prevent engaging the customer via web. In this case, the predictive analytics module 327 may determine that the optimal or desired modality is to engage the customer via, for example, SMS. Selection of SMS may be based on, for example, customer preferences or a business outcome, such as promoting SMS interactions. In this case, the predictive analytics module 327 may instruct the multimodal server 325 to send an SMS message to the customer. In response, the multimodal server 325 coordinates with the orchestration server 230 to send the SMS message by invoking, for example, the multimedia/social media server 154 of FIG. 1A. In some embodiments, there may be multiple levels of rules for certain interaction types and situations that are utilized to determine the right or desired modality.

For example, the system may recognize that the customer is in a public place and cannot enter credit card information via voice, and based on this data, may have rules to send an SMS to continue the interaction via SMS. For example, in this case the weights may point to sending an SMS for the customer to provide the credit card information, and the SMS may be secure and may have security built into it to authenticate the customer. However, while a first weights option may be to provide the SMS, if the customer is incapable of interacting via SMS (e.g., the customer is calling from a pay phone), then there may be a second weights option based on that specific flow and deciding factor of the customer calling from the payphone. So now, if the customer is calling from a public place, and from a payphone, the second weights option may be to transfer the customer to an IVR to enter the credit card information through touch tone, and the first weights option of sending the SMS may be weighted out. The customer may then proceed to complete the transaction via the IVR, or may be transferred back to the agent to continue the call.

There could be various criteria and sources of data enrichment used for relevant interaction channel selection. For example, some of the criteria may include rule definitions for given service types and interaction context, channel-related business outcome analytics, customer's channel preferences, customer's current channel capabilities, contact center channel capacities and capabilities, defined limit channel-related agent transfers (e.g., preference for channels may be selected depending on those that can be served by first assigned agent), etc.

In some embodiments a single agent may serve various channel mix. For example, the single agent may interact with the customer via both voice and chat. In some embodiments, multiple agents could each serve different channels for a single customer or interaction. For example, one agent handling a voice channel, and another agent handling a chat channel may be joined in a multimodal session to serve a single customer or related interactions. In this case the agents may be kept in sync to be informed of the customer's actions on any of the channels, for example, by real-time sharing of transcripts of their respective channels. In some cases, the agents may even be located at different geographical locations to handle their respective channels to serve the customer, and may be kept in sync by sharing information from their respective channels.

In an example of a debit/credit card activation issued by a bank for a voice and data capable customer according to an example embodiment of the present invention, the desired customer experience is to offer a self-service activation experience for new account activation that will reduce or eliminate the need for customers to speak with an agent (e.g., specialist) following the account activation. The bank's website, CompanyABC.com, and mobile mediums (e.g., the bank's app) will identify new customers and offer specific options to increase their ability to self-service.

In this example, a customer named Liz has received a new debit card in the mail and wants to setup a PIN to use the card at an ATM. Further, in this example, Liz has setup a username and password at CompanyABC.com, and has downloaded a mobile app associated with the bank. Accordingly, Liz is capable of interacting via phone, mobile app, and web, in this example.

Liz calls to active her card and is prompted to setup a PIN by an IVR in the same menu. Upon setting up the pin, a confirmation message of the actions is sent to acknowledge the card activation and new PIN setup. The confirmation message may be sent through SMS, PUSH notification, email, etc.

Liz reviews the confirmation message, but does not follow any of the provided links, since she authorized the transaction and is too busy at the moment. However, she later logs into the mobile application on her smartphone. On the mobile application, contextually relevant options are forwarded to the mobile application to ensure that the user is aware of pertinent resources available to them related to recent actions.

However, Liz only needs to check her account balance, and thus, she closes her mobile application before following any of the links. Liz later logs into the CompanyABC.com website. The contextually relevant options are also presented to her at the website, until another action or option supersedes or enough time has passed, for example.

In an example of making a credit card payment according to an example embodiment of the present invention, the desired customer experience is to notify the customer when a payment is needed, and the customer is guided to a self-service channel that they are likely or most likely to adopt. The customer is prompted to make the payment upon entry to the self-service channel. The customer is provided a simplified guided experience to schedule the payment, and may be prompted if additional guidance is needed (e.g., contextual help, video tours and instructions, chat, etc.)

In this example, a customer named Heather has received an alert via email that a payment for her credit card issued by a bank is due in 10 days. Further, in this example, Heather has setup a username and password at BankABC.com (the bank's website), and has downloaded a mobile app associated with the bank. Accordingly, Heather is capable of interacting via phone, mobile app, and web, in this example.

After reviewing the alert, Heather logs into the mobile app, and upon logging in, is shown a reminder about the payment. A similar reminder would have showed had Heather logged into the website instead. If Heather decides not to make the payment, both the mobile app and the website will display the same reminder the next time Heather logs in. However, once Heather makes the payment, the reminders on both the mobile app and the website are updated.

In this example, Heather decides to make the payment on the mobile application. Thus, Heather clicks on a Pay Card Now link from the mobile application, and is directed to an expedited payment flow. Accordingly, Heather's payment information is prepopulated, and Heather only needs to verify the information and to click on a submit payment link. Further, in some embodiments, after making the payment, Heather may be offered to setup automatic payments to avoid the need for further servicing.

As person of skill in the art should recognize that the flow and signaling diagrams described in the various embodiments are only exemplary. For example, the present invention is not limited to the sequence or number of the operations shown in the various flow and signaling diagrams, and the sequence or number of the operations can be altered into any desired sequence or number of operations as recognized by a person of ordinary skill in the art. For example, in some embodiments, the order may vary, or the method may include fewer or additional operations.

Figure 15A:
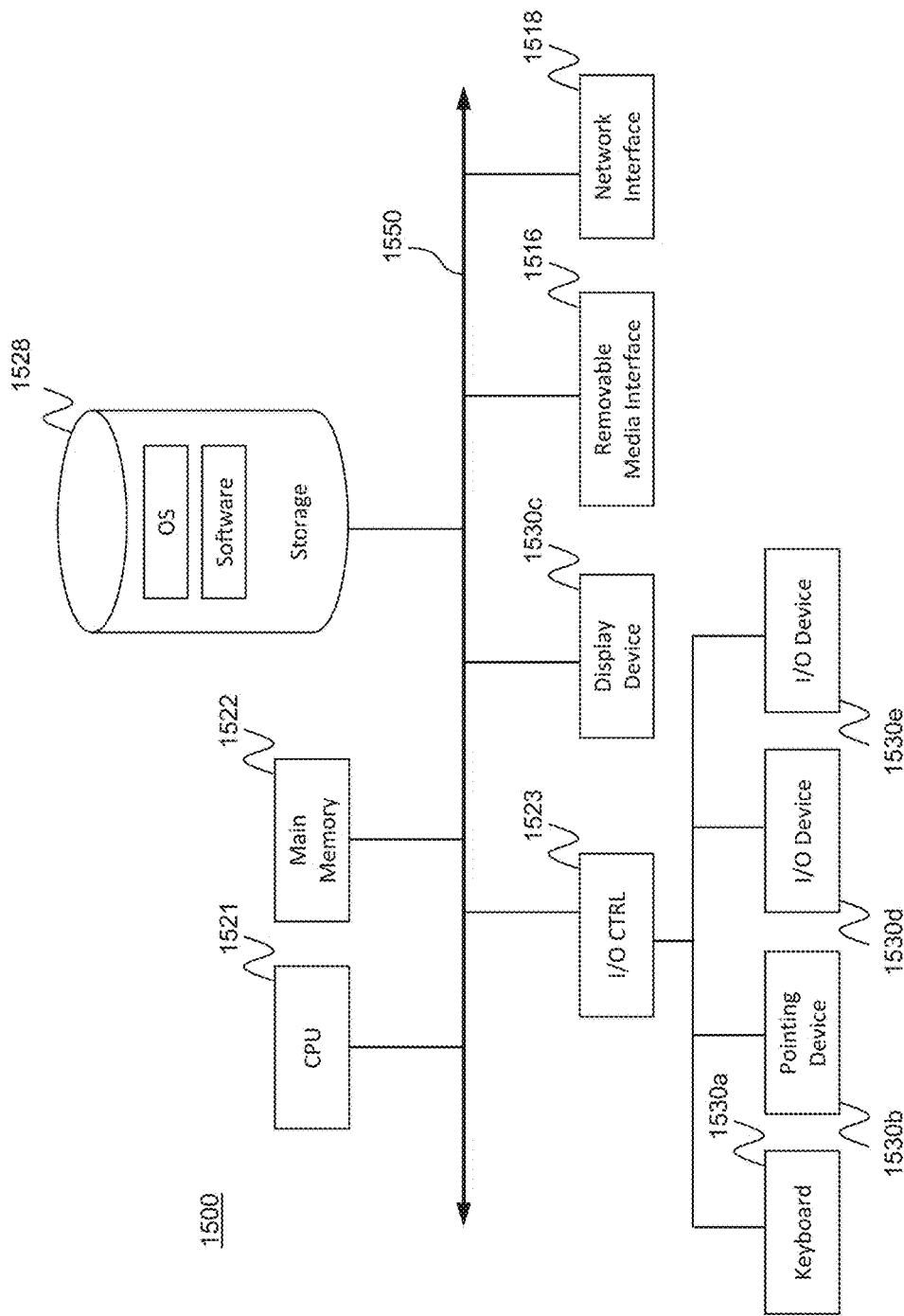
FIG. 15A is a block diagram of a computing device according to an exemplary embodiment of the present invention.
Figure 15B:
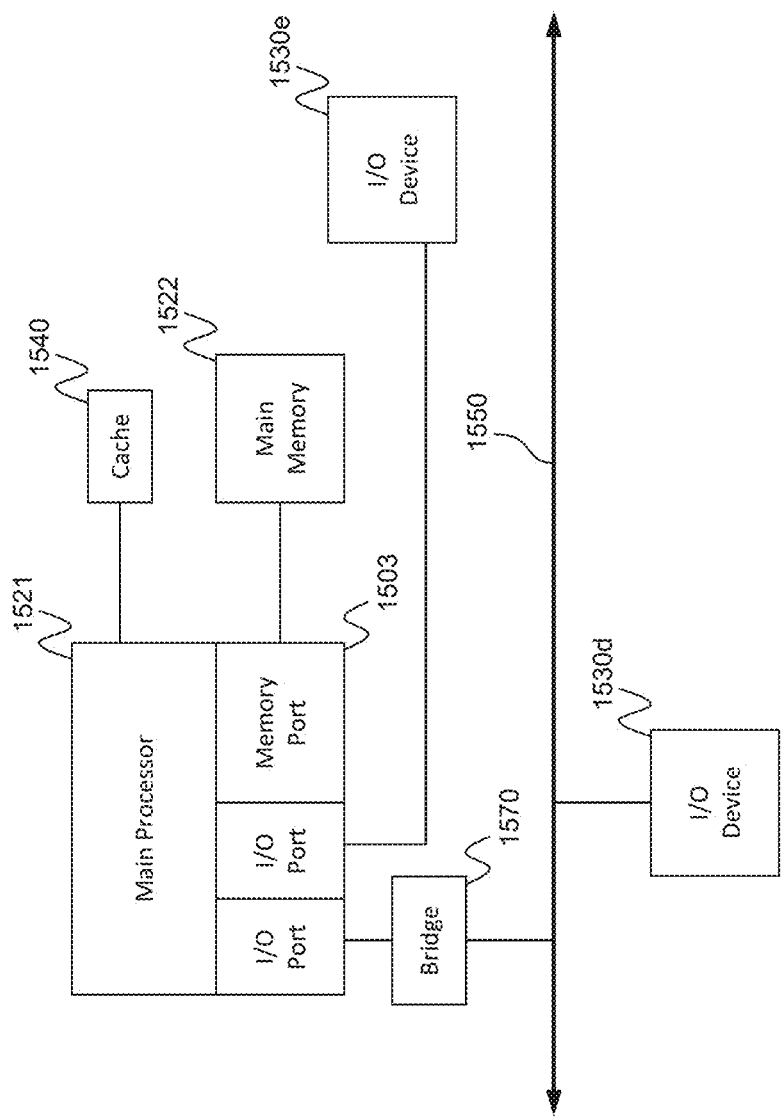
FIG. 15B is a block diagram of a computing device according to an exemplary embodiment of the present invention.
Figure 15D:
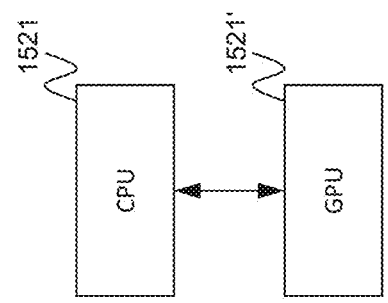
FIG. 15D is a block diagram of a computing device according to an exemplary embodiment of the present invention.
Figure 15C:
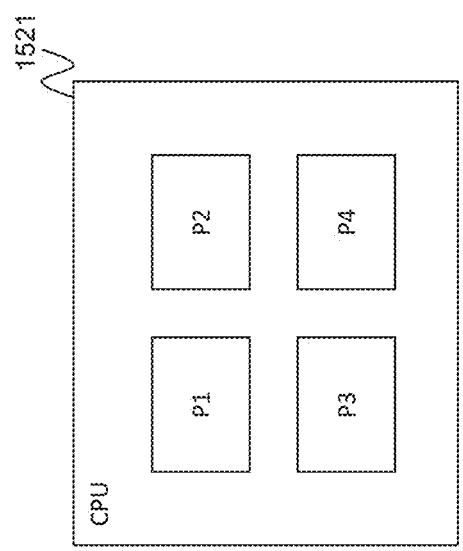
FIG. 15C is a block diagram of a computing device according to an exemplary embodiment of the present invention.
Figure 15E:
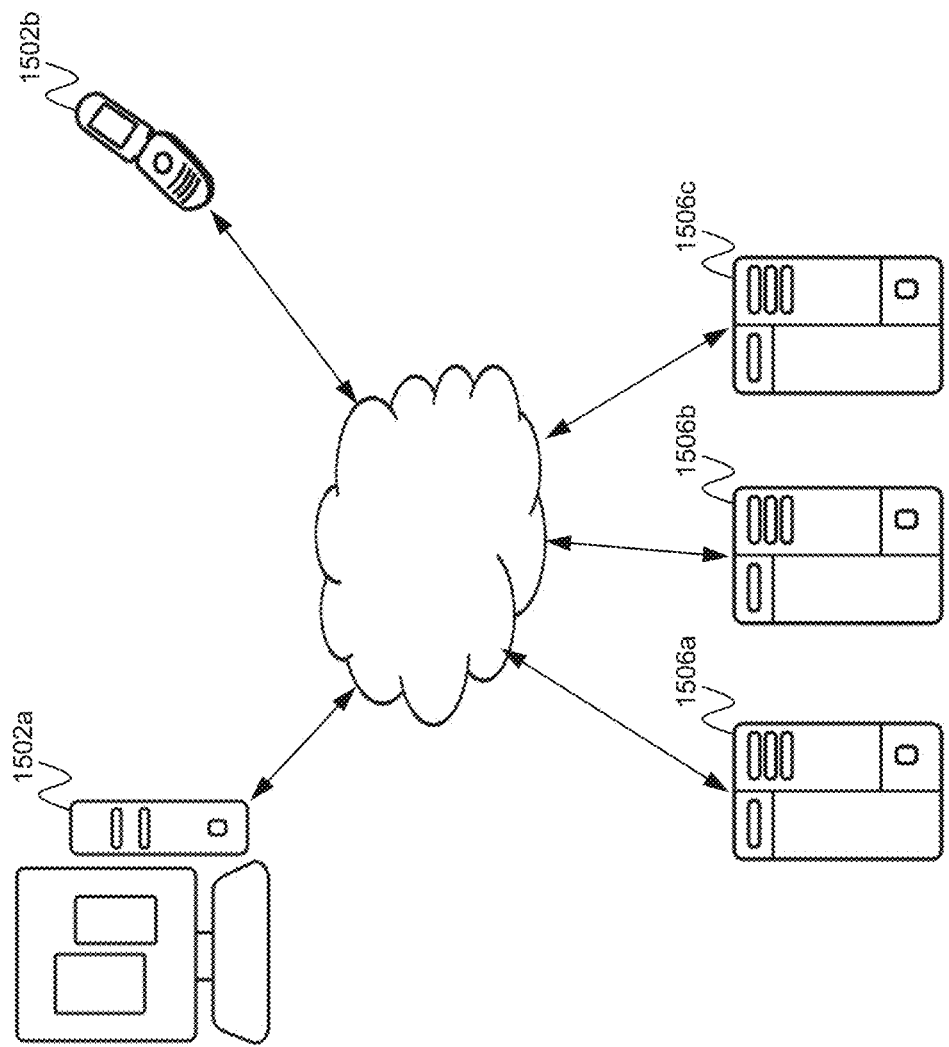
FIG. 15E is a block diagram of a network environment including several computing devices according to an exemplary embodiment of the present invention.

FIG. 15A is a block diagram of a computing device according to an embodiment of the present invention. FIG. 15B is a block diagram of a computing device according to an embodiment of the present invention. FIG. 15C is a block diagram of a computing device according to an embodiment of the present invention. FIG. 15D is a block diagram of a computing device according to an embodiment of the present invention. FIG. 15E is a block diagram of a network environment including several computing devices according to an embodiment of the present invention.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 15A, FIG. 15B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

FIG. 15A and FIG. 15B depict block diagrams of a computing device 1500 as may be employed in exemplary embodiments of the present invention. Each computing device 1500 includes a central processing unit 1521 and a main memory unit 1522. As shown in FIG. 15A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 15B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 50A, the central processing unit 1521 communicates with the main memory 1522 via a system bus 1550. As shown in FIG. 15B, the central processing unit 1521 may also communicate directly with the main memory 1522 via a memory port 1503.

FIG. 15B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 15A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP).

FIG. 15B depicts an embodiment of a computer 1500 in which the central processing unit 1521 communicates directly with I/O device 1530e. FIG. 15B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 15A, may control the I/O devices. The I/O controller may control one or more I/O devices such as a keyboard 1530a and a pointing device 1530b, e.g., a mouse or optical pen.

Referring again to FIG. 15A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 15A and FIG. 15B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device. In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

As shown in FIG. 15C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 15D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 15E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 15E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 15E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although the present invention has been described with reference to the example embodiments, those skilled in the art will recognize that various changes and modifications to the described embodiments may be performed, all without departing from the spirit and scope of the present invention. Descriptions of features or aspects within each example embodiment should typically be considered as available for other similar features or aspects in other example embodiments. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A contact center system for switching a communication event from one communication medium to another in a contact center, the system comprising:
one or more processors; and
one or more memory units, wherein the memory units have stored therein instructions that, when executed by the one or more processors, cause the one or more processors to respectively:
receive, by a first server module hosted by one of the one or more processors, a first interaction request via a first media channel from an endpoint device, wherein the first media channel is an audio channel;
identify a plurality of media channels based on constraints for determining one or more candidate media channels that are different from the first media channel;
identify a predictive model for selecting media channels;
estimate, based on the predictive model, an expected value that is anticipated to be obtained in utilizing each of the one or more candidate media channels to handle an interaction;
select a second media channel from the one or more candidate media channels based on the estimating;
identify a resource associated with the second media channel based on a routing strategy; transmit a reservation request for reserving the resource associated with the second media channel, wherein the resource is reserved for a preset amount of time;
transmit, by the first server module, a unique identifier associated with the reservation request to the endpoint device for establishing a second interaction request via the second media channel;
transmit, by the first server module, first audio instructions to the endpoint device over the first media channel, and further transmit, by the first server module, a first message corresponding to the first audio instructions, to a second server module hosted by the one or more processors;
render, by the second server module, first visual instructions in response to the received first message, the first visual instructions being communicated over the second media channel;
receive, by the second server module, over the second media channel, a user interaction in response to the rendered first visual instructions;
transmit, by the second server module, a second message to the first server module relating to the received user interaction;
determine, by the first server module, a next action in response to the received second message; and
transmit, by the first server module, second audio instructions to the endpoint device over the first media channel based on the determined next action, and further transmit a third message corresponding to the second audio instructions, to the second server module; and
render, by the second server module, second visual instructions in response to the received third message.

2. The system of claim 1, wherein the unique identifier is configured to expire after an expiration time has lapsed.

3. The system of claim 2, wherein the reserved resource is released when the second interaction request associated with the unique identifier is not received before lapse of the expiration time.

4. The system of claim 2, wherein the instructions further cause the processor to:
receive the second interaction request associated with the unique identifier via the second media channel; and
in response to identifying that the expiration time has not lapsed, route the second interaction request to the reserved resource.

5. The system of claim 1, wherein the instructions further cause the processor to:
determine a wait time for interacting with a resource associated with the first media channel, wherein the instructions that cause the processor to identify the second media channel is in response to identifying that the wait time for the resource at the first media channel exceeds a threshold wait time, and identifying that the second media channel has a wait time satisfying the threshold wait time.

6. The system of claim 1, wherein the second media channel is identified based on a reward predicted to be achieved by handling an interaction via the second media channel.

7. The system of claim 6, wherein the second media channel is further identified based on at least one of service rules associated with the interaction, customer preference, or capacity of contact center resources.

8. The system of claim 1, wherein the first interaction request is for a first mode of communication and the second interaction request is for a second mode of communication different from the first mode.

9. The system of claim 1, wherein the resource is a live agent, personnel, computer, software program, or telecommunications equipment.

10. The system of claim 1, wherein the constraints include service rules and/or service agreements.

11. The system of claim 1, wherein the estimate of the expected value is based on context data including at least one of profile data of the customer, intent of the customer, attributes of the candidate media channels, or profile data of agents of the contact center.

12. A method for switching a communication event from one communication medium to another in a contact center, the method comprising:
    receiving, by a first server module hosted by one of the one or more processors, a first interaction request via a first media channel from an endpoint device, wherein the first media channel is an audio channel;
    identifying, by the one or more processors, a plurality of media channels based on constraints for determining one or more candidate media channels that are different from the first media channel;
    identifying, by the one or more processors, a predictive model for selecting media channels;
    estimating, by the one or more processors, based on the predictive model, an expected value that is anticipated to be obtained in utilizing each of the one or more candidate media channels to handle an interaction;
    selecting, by the one or more processors, a second media channel from the one or more candidate media channels based on the estimating;
    identifying, by the one or more processors, a resource associated with the second media channel based on a routing strategy;
    transmitting, by the one or more processors, a reservation request for reserving the resource associated with the second media channel, wherein the resource is reserved for a preset amount of time;
    transmitting, by the first server module, a unique identifier associated with the reservation request to the endpoint device for establishing a second interaction request via the second media channel;
    transmitting, by the first server module, first audio instructions to the endpoint device over the first media channel, and further transmit, by the first server module, a first message corresponding to the first audio instructions, to a second server module hosted by the one or more processors;
    rendering, by the second server module, first visual instructions in response to the received first message, the first visual instructions being communicated over the second media channel;
    receiving, by the second server module, over the second media channel, a user interaction in response to the rendered first visual instructions;
    transmitting, by the second server module, a second message to the first server module relating to the received user interaction;
    determining, by the first server module, a next action in response to the received second message; and
    transmitting, by the first server module, second audio instructions to the endpoint device over the first media channel based on the determined next action, and further transmit a third message corresponding to the second audio instructions, to the second server module; and
    rendering, by the second server module, second visual instructions in response to the received third message.

13. The method of claim 12, wherein the unique identifier expires after an expiration time has lapsed.

14. The method of claim 13, wherein the reserved resource is released when the second interaction request associated with the unique identifier is not received before lapse of the expiration time.

15. The method of claim 13, further comprising:
    receiving, by the processor, the second interaction request associated with the unique identifier via the second media channel; and
    in response to identifying that the expiration time has not lapsed, routing, by the processor, the second interaction request to the reserved resource.

16. The method of claim 12, further comprising:
    determining, by the processor, a wait time for interacting with a resource associated with the first media channel, wherein the identifying of the second media channel is in response to identifying that the wait time for the resource at the first media channel exceeds a threshold wait time, and identifying that the second media channel has a wait time satisfying the threshold wait time.

17. The method of claim 12, wherein the second media channel is identified based on a reward predicted to be achieved by handling an interaction via the second media channel.

18. The method of claim 17, wherein the second media channel is further identified based on at least one of service rules associated with the interaction, customer preference, or capacity of contact center resources.

19. The method of claim 12, wherein the first interaction request is for a first mode of communication and the second interaction request is for a second mode of communication different from the first mode.

20. A contact center system for switching a communication event from one communication medium to another in a contact center, the system comprising:
    one or more processors; and
    one or more memory units, wherein the memory units have stored therein instructions that, when executed by the one or more processors, cause the one or more processors to respectively:
    receive, by a first server module hosted by one of the one or more processors, a first interaction request via a first media channel from an endpoint device, wherein the first media channel is an audio channel;
    establish a first communication with the endpoint device via the first media channel in response to the first interaction request, wherein the first communication is voice communication;
    determine that a second communication is to be established with the endpoint device via a second media channel different from the first media channel, wherein the second communication is non-voice communication;

transmit a unique identifier to the endpoint device for establishing the second communication with the endpoint device via the second media channel, wherein the second communication occurs concurrently with the first communication;

transmit, by the first server module, first audio instructions to the endpoint device over the first media channel, and further transmit, by the first server module, a first message corresponding to the first audio instructions, to a second server module hosted by the one or more processors;

render, by the second server module, first visual instructions in response to the received first message, the first visual instructions being communicated over the second media channel;

receive, by the second server module, over the second media channel, a user interaction in response to the rendered first visual instructions;

transmit, by the second server module, a second message to the first server module relating to the received user interaction;

determine, by the first server module, a next action in response to the received second message; and transmit, by the first server module, second audio instructions to the endpoint device over the first media channel based on the determined next action, and further transmit a third message corresponding to the second audio instructions, to the second server module;

and render, by the second server module, second visual instructions in response to the received third message.

21. The system of claim 20, wherein a second user interface of the second media channel is synchronized with a first user interface of the first media channel.

22. The system of claim 21, wherein the second user interface is updated based on events received by the first user interface.

23. The system of claim 21, wherein the first and second user interfaces are respectively first and second self-services menus, wherein menu options of the first and second self-service menus differ based on capabilities of the first and second media channels.

* * * * *